United States Patent
Shoji et al.

(10) Patent No.: US 9,193,006 B2
(45) Date of Patent: Nov. 24, 2015

(54) FRICTION STIR WELDING APPARATUS

(71) Applicants: F-TECH INC., Kuki, Saitama (JP); HONDA MOTOR CO., LTD., Tokyo (JP)

(72) Inventors: Yukio Shoji, Kazo (JP); Tsutomu Kobayashi, Wako (JP); Mitsuru Sayama, Wako (JP)

(73) Assignees: F-TECH INC., Saitama (JP); HONDA MOTOR CO., LTD., Tokyo (JP)

( * ) Notice: Subject to any disclaimer, the term of this patent is extended or adjusted under 35 U.S.C. 154(b) by 148 days.

(21) Appl. No.: 14/016,646

(22) Filed: Sep. 3, 2013

(65) Prior Publication Data

US 2014/0061283 A1    Mar. 6, 2014

(30) Foreign Application Priority Data

Sep. 4, 2012 (JP) ................................. 2012-194338

(51) Int. Cl.
*B23K 20/12* (2006.01)

(52) U.S. Cl.
CPC ........... *B23K 20/1245* (2013.01); *B23K 20/125* (2013.01)

(58) Field of Classification Search
None
See application file for complete search history.

(56) References Cited

U.S. PATENT DOCUMENTS

| | | | | |
|---|---|---|---|---|
| 6,497,355 | B1* | 12/2002 | Ding et al. | 228/2.1 |
| 7,455,210 | B2* | 11/2008 | Nagao et al. | 228/112.1 |
| 8,052,029 | B1* | 11/2011 | Sigler et al. | 228/103 |
| 2003/0183673 | A1* | 10/2003 | Hansen et al. | 228/2.1 |
| 2006/0169740 | A1* | 8/2006 | Fukuhara et al. | 228/2.1 |
| 2008/0083817 | A1* | 4/2008 | Baumann et al. | 228/102 |
| 2009/0272788 | A1* | 11/2009 | Fukushima et al. | 228/2.1 |
| 2011/0099808 | A1* | 5/2011 | Imamura et al. | 29/882 |
| 2012/0261457 | A1* | 10/2012 | Ohashi et al. | 228/102 |

FOREIGN PATENT DOCUMENTS

| | | |
|---|---|---|
| JP | 06-87075 A | 3/1994 |
| JP | 2004-136365 A | 5/2004 |
| JP | 4252403 B2 | 4/2009 |

* cited by examiner

*Primary Examiner* — Devang R Patel
(74) *Attorney, Agent, or Firm* — Westerman, Hattori, Daniels & Adrian, LLP

(57) ABSTRACT

A friction stir welding apparatus includes a displacement detecting device that detects displacement of a welding tool caused by deformation of a fitting jig, at the time of performing friction stir welding in which an arm to which the fitting jig fitted with the welding tool is fixed is moved to move the welding tool with respect to the processing target member. The fitting jig can be deformed more than the arm at the time of performing friction stir welding. The displacement detecting device has a displacement sensor fixed to the welding tool, and a reference member fixed to a fixing portion between the fitting jig and the arm to provide a reference position for detecting the displacement to the displacement sensor.

9 Claims, 12 Drawing Sheets

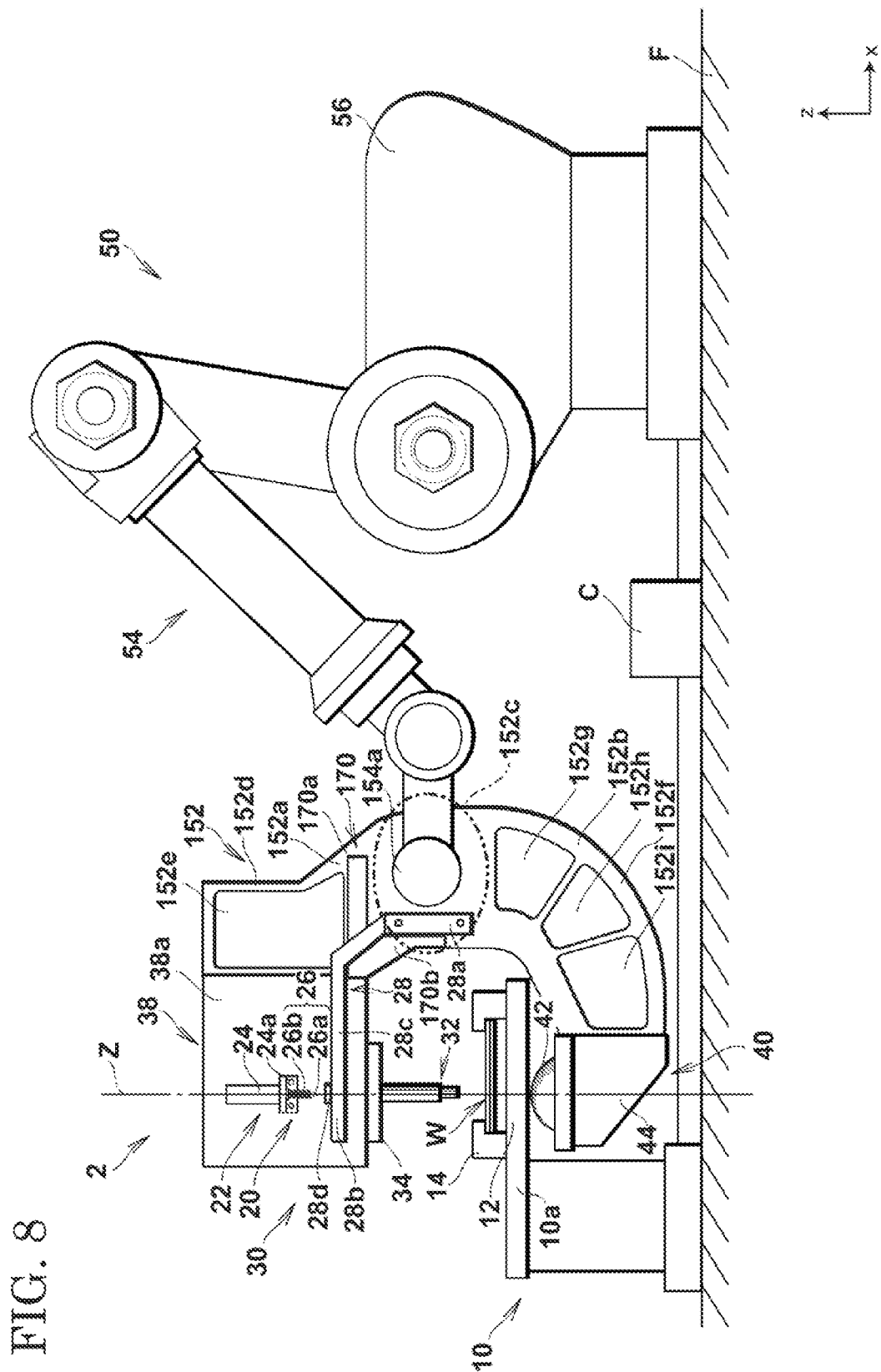

FRICTION STIR WELDING APPARATUS

BACKGROUND OF THE INVENTION

The present invention relates to a friction stir welding apparatus, and more particularly relates to a friction stir welding apparatus having a displacement detection device.

In recent years, in addition to general arc welding and the like, there has been proposed a friction stir welding apparatus that performs friction stir on a predetermined weld portion in a processing target component formed from a plurality of metal plates such as aluminum plates by using a probe rotating at a high speed, and that welds the metal plates to each other. A configuration including a weld portion welded by the friction stir welding apparatus has been realized even in strength components of a mobile object such as an automobile.

In such a friction stir welding apparatus, it is necessary to move the probe and the processing-target component relatively to each other, and precisely weld a predetermined weld portion. Therefore, it is important to move the probe and the processing target component relative to each other accurately without unnecessarily causing relative displacement therebetween.

Under such circumstances, Japanese Patent Application Laid-open Publication No. H6-87075 relates to an inclination control welding method, although does not relate to a friction stir welding apparatus. Such a configuration is disclosed in which a distance between a torch 1 and a workpiece 2 is measured momentarily by distance measuring sensors 15, 16, and 17 provided on right and left side surfaces and a front surface of the torch 1, and relative right and left inclination angles and longitudinal inclination angle of the torch 1 with respect to the workpiece 2 are controlled so that the torch 1 and the workpiece 2 can be held at predetermined angles, respectively, based on the measured values. Furthermore, right and left absolute angles and front and rear absolute angles of the torch 1 are measured momentarily by a torch inclination measuring sensor 18 provided on the top of the torch 1, and an optimum welding condition depending on the absolute angles of the torch 1 is selected from welding conditions by the absolute angles of the torch 1 based on the measured value, thereby executing control.

Japanese Patent Application Laid-open Publication No. 2004-136365 relates to a friction stir welding apparatus 20 and discloses a configuration including a tool-rotation drive unit 24, a tool-displacement drive unit 25, a tool movement-amount detecting unit 40, a welding-pressure detecting unit 41, a deflection-correction-data accumulating unit 42, a welding-condition-data accumulating unit 43, an inter-tool distance obtaining unit 44, a deflection-amount calculating unit 45, an input unit 46, a display unit 47, and a control unit 48. The deflection-correction-data accumulating unit 42 compiles a database and accumulates a deflection amount δ of the friction stir welding apparatus 20 with respect to a welding pressure F1 of a welding tool 21, and the deflection amount δ is obtained in advance by experiments. The deflection-amount calculating unit 45 extracts the deflection amount δ from the deflection-correction-data accumulating unit 42 based on a detection result provided by the welding-pressure detecting unit 41. It is also disclosed that the deflection amount δ is actually measured and stored.

SUMMARY OF THE INVENTION

However, according to studies made by the present inventors, in Japanese Patent Application Laid-open Publication No. H6-87075, such a configuration is disclosed that the distance between the torch 1 and the workpiece 2 is measured momentarily by the distance measuring sensors 15, 16, and 17 provided on the right and left side surfaces and the front surface of the torch 1, and relative right and left inclination angles and longitudinal inclination angle of the torch 1 with respect to the workpiece 2 are controlled so that the torch 1 and the workpiece 2 can be held at predetermined angles, respectively, based on the measured values. Furthermore, left and right absolute angles and front and rear absolute angles of the torch 1 are measured momentarily by the torch inclination measuring sensor 18 provided on the top of the torch 1, and an optimum welding condition depending on the absolute angles of the torch 1 is selected from welding conditions by the absolute angles of the torch 1 based on the measured value, thereby executing control. However, in the friction stir welding apparatus, there is no disclosure of controlling the distance between a probe and a processing target component to a predetermined distance.

Furthermore, according to the studies made by the present inventors, in Japanese Patent Application Laid-open Publication No. 2004-136365, the deflection-correction-data accumulating unit 42 compiles the database and stores the deflection amount δ obtained based on actual, measurement values obtained by actually measuring the deflection amount δ when the welding tool 21 applies a plurality of welding pressures F1 different from each other to a support tool 30 via a member to be welded 22 and interpolated values thereof. The inter-tool distance obtaining unit 44 calculates an inter-tool distance D3 based on a detection result of the tool movement-amount detecting unit 40 that detects a moving distance in a direction of a reference axis L1 in a tool retainer 23 and an extraction result of the deflection-amount calculating unit 45 that extracts the deflection amount δ from the deflection-correction-data accumulating unit 42 based on a detection result of the welding-pressure detecting unit 41 that detects the welding pressure F1 to be applied to the member to be welded 22 by the welding tool 21. The control unit 48 controls the tool-rotation drive unit 24 and the tool-displacement drive unit 25 based on the thus calculated inter-tool distance D3, to adjust the welding pressure F1 of the welding tool 21, so that the welding tool 21 is immersed in the member to be welded 22 up to a position at which a target inter-tool distance D4 is achieved. However, the actual measurement values obtained by actually measuring the deflection amount δ beforehand and the interpolated values thereof need to be compiled in the database and stored, and thus the configuration becomes complicated. Particularly, an optimum deflection amount δ cannot be compiled in the database and prepared with respect to a wide variety of processing target components in which the shape of a portion to be friction stir welded varies, and thus there is a room for improvement.

Therefore, under present circumstances, a friction stir welding apparatus having a new configuration that can control a distance between a probe and a processing target component to a predetermined distance in a mode having high application flexibility with a simple configuration with respect to a wide variety of processing target components in which the shape of the portion to be friction stir welded varies has been desired.

The present invention has been achieved in order to solve the above problems, and an object of the present invention is to provide a friction stir welding apparatus having a new configuration that can control a distance between a probe and a processing target component to a predetermined distance in a mode having high application flexibility with a simple configuration with respect to a wide variety of processing target components in which the shape of the portion to be friction stir welded varies, while compensating unnecessary displacement of the probe.

To achieve the above object, a first aspect of the present invention is to provide a friction stir welding apparatus including a welding tool having a probe that is vertically movable with respect to a processing target side surface of a processing target member and rotatable with respect to the processing target member, a mounting member on which the processing target member is mounted, a movement mechanism that has an arm to which a fitting jig fitted with the welding tool is fixed and can move the welding tool with respect to the processing target member by moving the arm, and a displacement detecting device that detects displacement of the welding tool caused by deformation of the fitting jig, at a time of performing friction stir welding in which the arm is moved to move the welding tool with respect to the processing target member, while stirring the processing target member by rotating the probe with respect to the processing target member and pressing the probe to intrude into the processing target member, in which the fitting jig can be deformed more than the arm at the time of performing friction stir welding, and in which the displacement detecting device has a displacement sensor fixed to the welding tool, and a reference member fixed to a fixing portion between the fitting jig and the arm to provide a reference position at a time of detecting the displacement to the displacement sensor.

According to a second aspect of the present invention, in addition to the first aspect, the displacement sensor is a contact-type displacement sensor, and the reference member includes a first end fixed to the fixing portion, a second end opposite to the first end, and an extending portion that extends with respect to the fitting jig between the first end and the second end without being constrained, with a contact member of the displacement sensor being able to contact with the second end.

According to a third aspect of the present invention, in addition to the second aspect, a moving direction of the contact member of the displacement sensor is parallel to a central axis of the probe, and the displacement sensor and the reference member respectively include a first pair and a second pair in which the contact member and the second end are arranged symmetrically with respect to the central axis of the probe.

According to a fourth aspect of the present invention, in addition to the third aspect, the friction stir welding apparatus further includes a connecting member that connects between the extending portion of the reference member in the first pair and the extending portion of the reference member in the second pair.

According to a fifth aspect of the present invention, in addition to any of the first to fourth aspects, the fitting jig further includes a reinforcing member between the welding tool and the fixing portion.

According to a sixth aspect of the present invention, in addition to the fifth aspect, the reinforcing member has an expanded portion expanded toward the fixing portion.

According to a seventh aspect of the present invention, in addition to any of the first to sixth aspects, the movement mechanism is an industrial robot.

According to an eighth aspect of the present invention, in addition to any of the first to seventh aspects, the friction stir welding apparatus further includes an auxiliary support mechanism that supports the mounting member by an auxiliary support member to auxiliary support only a vertical position of the processing target member, and the auxiliary support mechanism is fitted to the fitting member.

According to a ninth aspect of the present invention, in addition to the eighth aspect, the friction stir welding apparatus further includes a guide member that guides the auxiliary support member.

According to a tenth aspect of the present invention, in addition to the eighth or ninth aspect, the fitting jig has a first fitting portion that connects the welding tool and the fixing portion, and a second fitting portion that connects the auxiliary support mechanism and the fixing portion, and an inertial weight of the first fitting portion when the arm moves the fitting jig is smaller than that of the second fitting portion when the arm moves the fitting jig.

According to an eleventh aspect of the present invention, in addition to any of the eighth to tenth aspects, the fitting jig is an integrally molded product made of metal, and the first fitting portion and the second fitting portion have a depressed portion provided in a depressed manner in which peripheral edges of respective vertical wall surfaces are left, and a circumferential end of the second fitting portion has a circular arc shape.

According to the configuration of the first aspect, the friction stir welding apparatus includes the displacement detecting device that detects displacement of the welding tool caused by deformation of the fitting jig, at the time of performing friction stir welding in which the arm is moved to move the welding tool with respect to the processing target member, while stirring the processing target member by rotating the probe relative to the processing target member and pressing the probe to intrude into the processing target member. At the time of performing friction stir welding, the fitting jig can be deformed more than the arm. The displacement detecting device includes the displacement sensor fixed to the welding tool, and the reference member fixed to the fixing portion between the fitting jig and the arm to provide the reference position for displacement detection with respect to the displacement sensor. Accordingly, the distance between the probe and the processing target component can be controlled to a predetermined distance in a mode having high application flexibility with a simple configuration with respect to a wide variety of processing target components in which the shape of the portion to be friction stir welded varies, while compensating unnecessary displacement of the probe.

According to the configuration of the second aspect, the displacement sensor is a contact-type displacement sensor, and the reference member includes the first end fixed to the fixing portion fixed on which the fitting jig is fixed to the arm, the second end opposite to the first end, and the extending portion that extends with respect to the fitting jig between the first end and the second end without being constrained, with the contact member of the displacement sensor being able to contact with the second end. Accordingly, the distance between the probe and the processing target component can be controlled to a predetermined distance in a mode having higher application flexibility with a simpler configuration with respect to a wide variety of processing target components in which the shape of the portion to be friction stir welded varies, while compensating unnecessary displacement of the probe more reliably.

According to the configuration of the third aspect, because the moving direction of the contact member of the displacement sensor is parallel to the central axis of the probe, the contact member vertically moves, while coming into contact with the reference member at the time of performing friction stir welding. As a result, vertical displacement of the probe caused by deformation of the fitting jig can be detected accurately. Furthermore, because the displacement sensor and the reference member respectively include the first pair and the second pair in which the contact member and the second end are arranged symmetrically with respect to the central axis of the probe, the vertical displacement of the probe can be obtained at two displacement detecting positions close to the displacement in a mode in which a calculation process can be easily performed.

According to the configuration of the fourth aspect, because the connecting member that connects between the extending portion of the reference member in the first pair and the extending portion of the reference member in the second pair is provided, connection strength between the reference members increases to improve the strength and the rigidity of the entire reference member, thereby enabling to obtain a positional reference of the displacement sensor more accurately.

According to the configuration of the fifth aspect, because the fitting jig includes the reinforcing member between the welding tool and the fixing portion, stress generated in the fitting jig at the time of performing friction stir welding can be reduced.

According to the configuration of the sixth aspect, because the reinforcing member has the expanded portion expanded toward the fixing portion, stress generated in the fitting jig at the time of performing friction stir welding can be reduced more reliably.

According to the configuration of the seventh aspect, because the movement mechanism is an industrial robot, a friction stir welding apparatus that can reliably control the distance between the probe and the processing target component to a predetermined distance with a more versatile configuration can be realized.

According to the configuration of the eighth aspect, the auxiliary support mechanism fitted to the arm to support the mounting member by the auxiliary support member to auxiliary support only the vertical position of the processing target member is provided. Therefore, the probe and the processing target member can be positioned more accurately, and friction stir welding can be performed while controlling the distance between the probe and the processing target component to a predetermined distance more reliably.

According to the configuration of the ninth aspect, the friction stir welding apparatus further includes the guide member that guides the auxiliary support member. Therefore, the probe and the processing target member can be positioned more accurately, and friction stir welding can be performed while controlling the distance between the probe and the processing target component to a predetermined distance more reliably.

According to the configuration of the tenth aspect, the fitting jig has the first fitting portion that connects the welding tool and the fixing portion, and the second fitting portion that connects the auxiliary support mechanism and the fixing portion, and the inertial weight of the first fitting portion when the arm moves the fitting jig is set to be smaller than that of the second fitting portion when the arm moves the fitting jig. Therefore, when the arm moves the fitting jig to move the welding tool in a welding direction close to the processing target member, turn-in ability on the side of the welding tool can be improved, in a state where the posture of the auxiliary support mechanism is stabilized, and thus the operability of the fitting jig fitted with the welding tool and the auxiliary support mechanism by the arm can be improved.

According to the configuration of the eleventh aspect, the fitting jig is an integrally molded product made of metal, and the first fitting portion and the second fitting portion have the depressed portion provided in the depressed manner in which peripheral edges of respective vertical wall surfaces are left, and a circumferential end of the second fitting portion has a circular arc shape. Therefore, generation of unnecessary stress in the fitting jig at the time of performing friction stir welding can be suppressed while achieving weight reduction of the fitting jig.

BRIEF DESCRIPTION OF THE DRAWINGS

FIG. 8 is a side view showing an overall configuration of a friction stir welding apparatus according to a second embodiment of the present invention;

FIG. 11A is a front view of FIG. 10A as viewed in a positive direction of an x-axis and FIG. 1 is a rear view of FIG. 10A as viewed in a negative direction of the x-axis.

DETAILED DESCRIPTION OF THE PREFERRED EMBODIMENT

Figure 1:
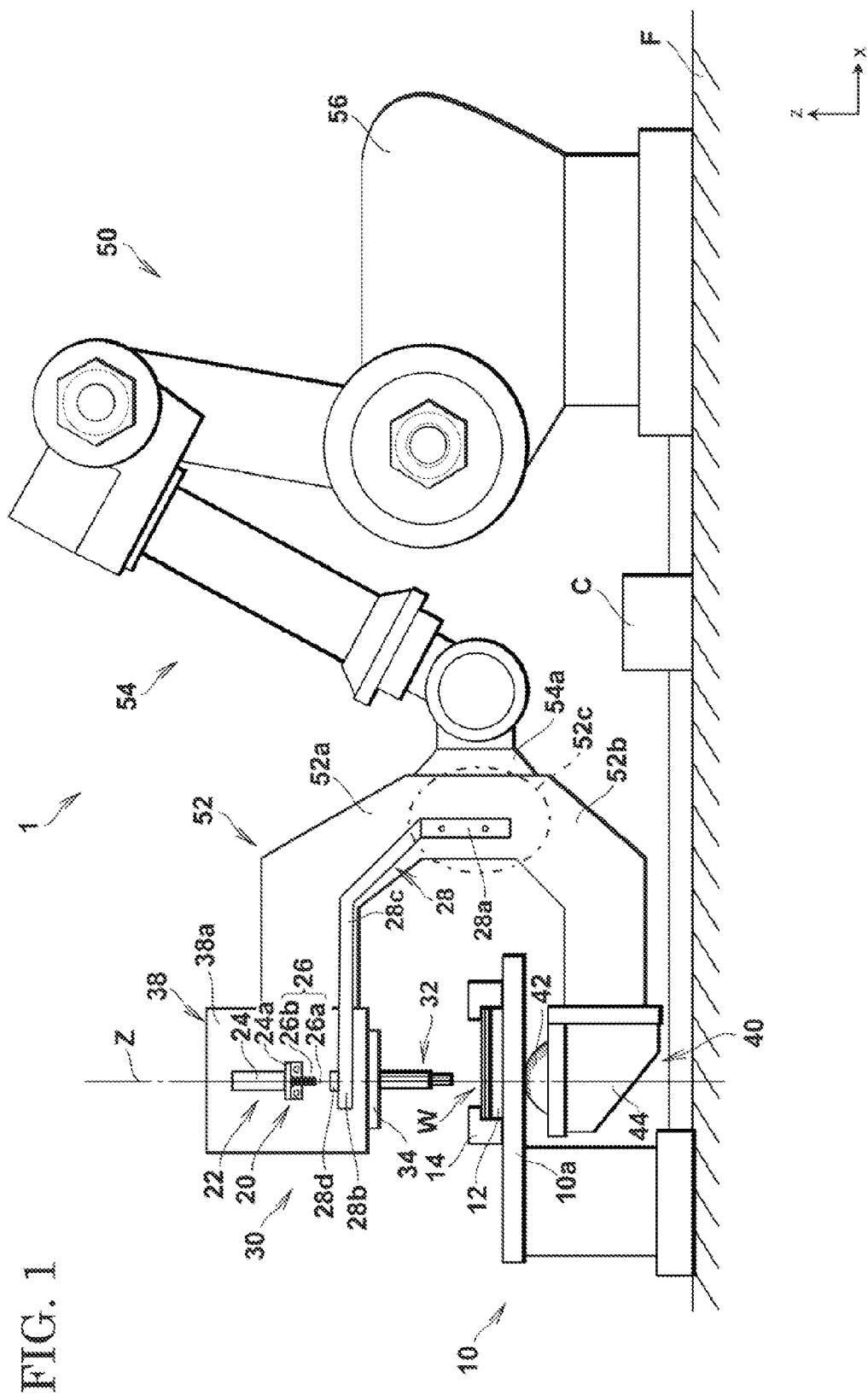
FIG. 1 is a side view showing an overall configuration of a friction stir welding apparatus according to a first embodiment of the present invention.

A friction stir welding apparatus according to an embodiment of the present invention is explained in detail below with reference to the accompanying drawings. In the drawings, an x-axis, a y-axis, and a z-axis constitute a three-axis orthogonal coordinate system. A plane defined by the x-axis and the y-axis is parallel to a horizontal plane, and a positive direction of the z-axis is an upward direction.

First Embodiment

A friction stir welding apparatus according to a first embodiment of the present invention is explained in detail with reference to FIGS. 1 to 7.

Figure 2:
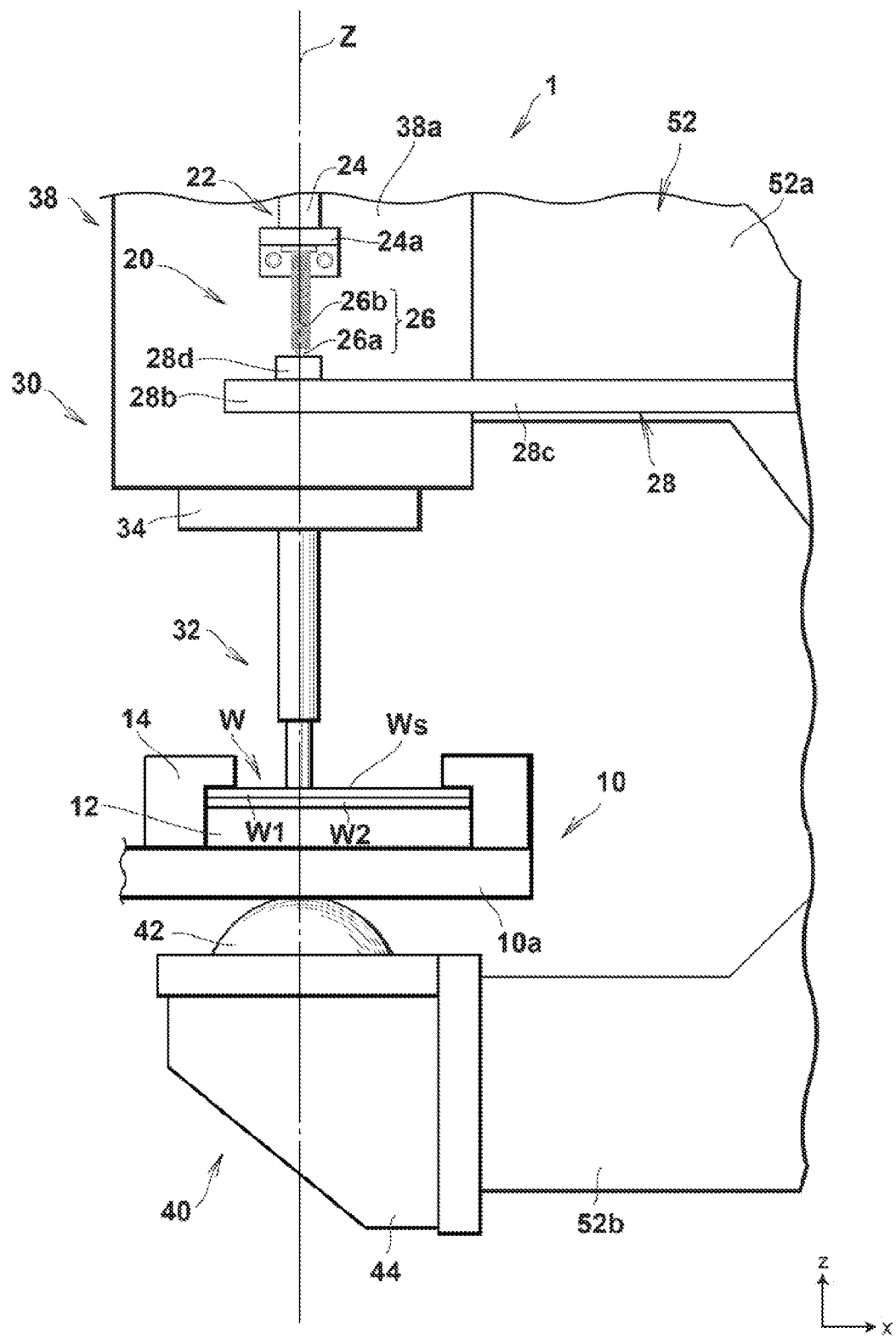
FIG. 2 is a partially enlarged side view of the friction stir welding apparatus according to the first embodiment.
Figure 3:
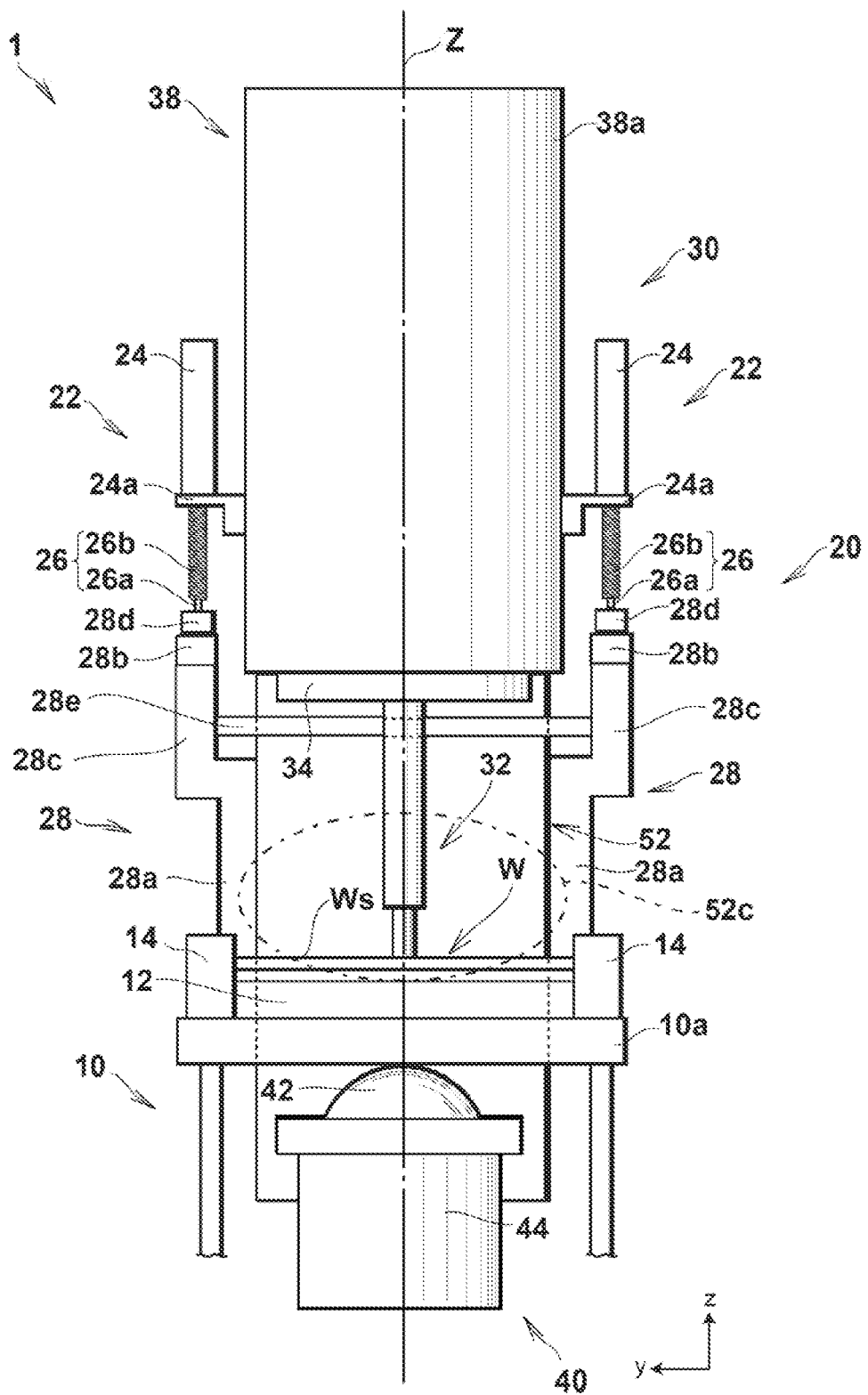
FIG. 3 is a partially enlarged front view of the friction stir welding apparatus according to the first embodiment.

FIG. 1 is a side view showing an overall configuration of the friction stir welding apparatus according to the first embodiment. FIG. 2 is a partially enlarged side view of the friction stir welding apparatus according to the first embodiment. FIG. 3 is a partially enlarged front view of the friction stir welding apparatus according to the first embodiment.

As shown in FIGS. 1 to 3, a friction stir welding apparatus 1 includes a mounting table 10 fixedly installed on a floor F so that a processing target member W is mounted thereon, a displacement detection device 20 that can be arranged opposite to the mounting table 10 above the mounting table 10, a welding tool 30 that is fitted with the displacement detection device 20 and can be arranged opposite to the mounting table 10 above the mounting table 10, an auxiliary support mechanism 40 that can be arranged so as to come into contact with a lower surface of the mounting table 10 below the mounting table 10, and a robot 50 fixedly installed on the floor F so as to hold the welding tool 30 and the auxiliary support mechanism 40 by a fitting jig 52. When the fitting jig 52 deforms at the time of performing friction stir welding, the welding tool 30 fitted thereto is displaced.

Specifically, the mounting table 10 is a mounting member including a mounting jig 12 that mounts the processing target member W on a mounting portion 10a thereof, and a stopper 14 arranged on the mounting jig 12 to detachably fix the processing target member W. The processing target member W is typically a plate member made of metal such as an aluminum material, in which a first member W1 and a second member W2 are juxtaposed in a vertical direction and respectively have an overlapped portion on each other. Predetermined portions of the overlapped portions of the first member W1 and the second member W2 are welded along a predetermined weld line by the welding tool 30 that is moved along a predetermined processing direction. The position of the processing target member W on the mounting jig 12 is maintained accurately by holding a part of the processing target member W by the stopper 14. As a drive source for driving the stopper 14, a motor or an air cylinder can be mentioned. Needless to mention, the stopper 14 can be driven manually.

Typically, the displacement detecting device 20 is a contact-type displacement detecting device, and includes a pair of displacement sensors 22 and a pair of reference members 28 that are typically made of metal and provide a reference position corresponding to each of the displacement sensors 22 at the time of detecting displacement. Each of the displacement sensors 22 includes a sensor body 24 and a movable unit 26 including a contact member 26a that is connected to the sensor body 24, a bellows 26b that covers the contact member 26a except the end thereof, into which the contact member 26a is inserted. The contact member 26a is applied with a urging force to be urged downward with respect to the sensor body 24 by an urging member such as a coil spring (not shown) and is fitted to the sensor body 24. The respective displacement sensors 22 can detect an amount of movement of the contact member 26a when the contact member 26a is pushed into the sensor body 24 against the urging force by the reference member 28 and is shifted upward, and displacement of a probe 32 of the welding tool 30 due to deformation of the fitting jig 52, corresponding to the amount of movement when the contact member 26a is shifted downward while being pushed back from the sensor body 24 by the urging force so as to be away from the reference member 28, in a state where a lower end of the contact member 26a comes into contact with an upper surface of the corresponding reference member 28.

The welding tool 30 includes the probe 32 that is typically a columnar member made of metal such as an iron material extending in a vertical direction and is rotatable around a central axis Z, which is parallel to the z-axis, and can move vertically, a holder 34 that holds the probe 32, and a drive mechanism 38 that causes the probe 32 held by the holder 34 to move vertically and rotate around the central axis Z. The drive mechanism 38 includes a motor, a shaft (both not shown), and the like incorporated in a casing 38a. The direction of the central axis Z of the probe 32 is a pressing direction for pressing the processing target member W by rotating the probe 32 at the time of performing friction stir welding.

The casing 38a also functions as a frame member fixed to the fitting jig 52 while supporting various constituent components, and has a hollow cuboidal shape as an example of the structure thereof. The displacement sensor 22 is respectively fixed to the sensor body 24 via a fixed member 24a on a vertical wall surface on a positive direction side of the y-axis and a vertical wall surface on a negative direction side of the y-axis in the casing 38a. Because both vertical wall surfaces are at symmetrical positions with respect to the central axis Z of the probe 32, the pair of displacement sensors 22, more specifically, the contact members 26a thereof are arranged at axisymmetrical positions with respect to the central axis Z of the probe 32, and the respective contact members 26a can move vertically along a moving axis matched with the central axis Z of the probe 32 as viewed in the direction of the y-axis. Accordingly, the displacement detecting device 20 can accurately detect displacement of the probe 32 caused by deformation of the fitting jig 52.

In the welding tool 30, when the drive mechanism 38 moves the holder 34 that holds the probe 32 downward, a lower part of the probe 32 is press-fitted into the processing target member W, and can reach a position at which the probe 32 intrudes into the second member W2, penetrating through the first member W1 in the processing target member W. An upper surface of the first member W1 of the processing target member W is referred to as "processing target side surface Ws" for convenience' sake.

The auxiliary support mechanism 40 includes an auxiliary support member 42, which is typically a ball member made of metal such as an iron material, and comes into contact with a lower surface of the mounting portion 10a on an opposite side to the mounting jig 12, and a holder 44 that holds the auxiliary support member 42 rotatably while immovably maintaining the central position thereof. In the auxiliary support mechanism 40, the auxiliary support member 42 can auxiliary support the mounting table 10 while coming into contact with the lower surface of the mounting portion 10a of the mounting table 10 at one point on the upper part of the auxiliary support member 42, in a state where the auxiliary support member 42 faces a lower end of the probe 32, thereby putting the processing target member W therebetween.

The robot 50 is a movement mechanism that can move the welding tool 30 and the processing target member W fixed on the mounting jig 12 of the mounting table 10 relative to each other, and typically, is an industrial robot. Specifically, the robot 50 includes a fitting jig 52 made of metal in a two-pronged shape as viewed from the side, which is typically a machinery cutting steel product and has an upper fitting portion 52a and a lower fitting portion 52b, respectively, fitted with the welding tool 30 and the auxiliary support mechanism 40 correspondingly, an arm 54 fitted with the fitting jig 52, which is typically a manipulator having multiple joints, and a robot body 56 having a drive mechanism that moves the arm 54, a computing processing device, and a memory (not shown) incorporated therein.

While the casing 38a of the drive mechanism 38 of the welding tool 30 is fitted and fixed to the upper fitting portion 52a of the fitting jig 52, the holder 44 of the auxiliary support mechanism 40 is fitted and fixed to the lower fitting portion 52b of the fitting jig 52. A fixing portion 52c in a connected portion between the upper fitting portion 52a and the lower fitting portion 52b of the fitting jig 52 is fixed and fitted to a support portion 54a at one end of the arm 54 by fastening and the like, and the robot body 56 is connected to the other end of the arm 54. By operating the drive mechanism of the robot body 56, the arm 54 moves, and corresponding thereto, the welding tool 30 and the auxiliary support mechanism 40 can be moved with multiple degrees of freedom such as vertically and horizontally while maintaining the relative positional relation between the welding tool 30 and the auxiliary support mechanism 40. At the time of performing friction stir welding in which the probe 32 of the welding tool 30 fitted to the upper fitting portion 52a of the fitting jig 52 is pressed against the processing target member W by moving the arm 54 by the drive mechanism of the robot body 56, rigidity of the upper fitting portion 52a that connects the fitting jig 52, specifically, the welding tool 30 and the arm 54 is set to be lower than that of the arm 54. Accordingly, in such a case, only the part of the upper fitting portion 52a becomes a deforming portion that deforms at the time of performing friction stir welding. In other words, by providing a specific deforming portion that deforms at the time of performing friction stir welding, it suffices to only detect displacement of the probe 32, substantially taking into consideration only deformation of the deforming portion at the time of performing friction stir welding.

A first end 28a of the reference member 28 is respectively fixed by fastening and the like to the vertical wall surface on the positive direction side of the y-axis (a surface parallel to an x-z plane) and the vertical wall surface on the negative direction side of the y-axis (a surface parallel to the x-z plane) in the fixing portion 52c of the fitting jig 52. At the time of performing friction stir welding by the friction stir welding apparatus 1, it is evaluated that the rigidity of a portion of the fitting jig 52 fixed by the fixing portion 52c is equal to that of the arm 54. The respective reference members 28 include a second end 28b facing the first end 28a, and an extending portion 28c that extends between the first end 28a and the second end 28b to connect the ends, and are arranged corresponding to the positive direction side of the y-axis and the negative direction side of the y-axis of the casing 38a and the fitting jig 52. Specifically, in the reference member 28 provided on the positive direction side of the y-axis, a lower end of the contact member 26a of the displacement sensor 22 provided on the positive direction side of the y-axis can come into contact with an upper surface of a receiving member 28d fixedly installed on the second end 28b, and the extending portion 28c extends away from the vertical wall surface on the positive direction side of the y-axis of the fitting jig 52 in an unconstrained state. Similarly, in the reference member 28 provided on the negative direction side of the y-axis, the lower end of the contact member 26a of the displacement sensor 22 provided on the negative direction side of the y-axis can come into contact with the upper surface of the receiving member 28d fixedly installed on the second end 28b, and the extending portion 28c extends away from the vertical wall surface on the negative direction side of the y-axis of the fitting jig 52 in an unconstrained state. That is, the displacement sensor 22 and the reference member 28 provided on the positive direction side of the y-axis and the displacement sensor 22 and the reference member 28 provided on the negative direction side of the y-axis form a pair correspondingly, and the displacement detecting device 20 can detect displacement at two positions. It is preferable to connect the extending portions 28c of the respective reference members 28 with each other by a connecting member 28e typically made of metal and having sufficient rigidity and strength, because connection strength between the reference members 28 increases, and the strength and the rigidity of the entire reference member 28 are improved.

Relevant respective constituent components of the friction stir welding apparatus 1 are appropriately controlled by receiving a control signal transmitted from a controller C, and operate to perform friction stir welding with respect to the processing target member W. Specifically, the controller C moves the welding tool 30 downward to the processing target member W to press-fit the probe 32 into the processing target member W and to rotate the probe 32, and stirs the processing target member W by the probe 32 while generating friction heat in the processing target member W. The controller C executes control to perform friction stir welding with respect to the processing target member W along a predetermined weld line by moving the probe 32 and the processing target member W relative to each other by the arm 54 of the robot 50, while detecting an amount of movement of the contact members 26a of the respective displacement sensors 22 while coming into contact with the corresponding reference member 28. Because the respective contact members 26a can move in the vertical direction along the moving axis matched with the central axis Z of the probe 32 as viewed in the direction of the y-axis, the contact members 26a move vertically while coming into contact with the reference member 28 at the time of performing friction stir welding. As a result, vertical displacement of the probe 32 due to deformation of the fitting jig 52, specifically, deformation of the upper fitting portion 52a can be accurately detected. Because the respective contact members 26a and the corresponding receiving members 28d are arranged at axisymmetrical positions with respect to the central axis Z of the probe 32, vertical displacement of the probe 32 can be obtained at two displacement detecting positions close to the displacement of the probe 32 in a mode in which a calculation process can be easily performed. The controller C has a computing processing device and a memory (both not shown) incorporated therein, and data and the like relating to a control program for performing friction stir welding and a predetermined processing direction are stored in the memory.

A friction stir welding method of performing friction stir welding with respect to the processing target member W by using the friction stir welding apparatus 1 having the configuration described above is explained below in detail.

Before starting a series of processes of the friction stir welding method, as preparation therefor, the welding tool 30 is fitted and fixed to the upper fitting portion 52a of the fitting jig 52, and the auxiliary support mechanism 40 is fitted and fixed to the lower fitting portion 52b of the fitting jig 52 in the robot 50.

Simultaneously therewith, after the processing target member W to which friction stir welding is performed is mounted on the mounting jig 12 of the mounting table 10, a part of the processing target member W is held by the stopper 14, thereby positioning and fixing the processing target member W.

The series of processes of the friction stir welding method is started. In the series of processes, the controller C executes automatic control according to a control program by using the control program and data stored in the memory.

First, under control of the controller C, as shown in FIG. 1, the drive mechanism of the robot body 56 appropriately moves the arm 54 vertically and horizontally, to arrange the probe 32 of the welding tool 30 fitted to the upper fitting portion 52a of the fitting jig 52 so as to face the processing target member W at a predetermined position above the processing target member W, and bring the auxiliary support member 42 of the auxiliary support mechanism 40 fitted to the lower fitting portion 52b of the fitting jig 52 into contact with the lower surface of the mounting portion 10a of the mounting table 10 at one point on the upper part of the auxiliary support member 42 so as to face the lower part of the probe 32, putting the processing target member W therebetween. At this time, on the positive direction side and the negative direction side of the y-axis with respect to the probe 32, the contact member 26a of each displacement sensor 22 is respectively arranged at a predetermined position above the reference member 28 to face the reference member 28.

When respective positions of the probe 32, and the two displacement sensors 22 and auxiliary support members 42 are realized, under control of the controller C, as shown in FIGS. 2 and 3, the drive mechanism 38 of the welding tool 30 moves the holder 34 holding the probe 32 downward to move the probe 32 downward, so that the lower part of the probe 32 reaches a predetermined position at which the lower part of the probe 32 penetrates through the first member W1 in the processing target member W and intrudes into the second member W2. The intruding depth of the probe 32 penetrating through the first member W1 and intruding into the second member W2 is maintained substantially constant at the time of performing friction stir welding. At this time, on the positive direction side and the negative direction side of the y-axis, the lower end of the contact member 26a of each displacement sensors 22 is brought into contact with the upper surface of the receiving member 28d of the reference member 28, and pushed into the sensor body 24 by a predetermined amount. At this time, the drive mechanism 38 of the welding tool 30 can rotate the probe 32 via the holder 34 according to need.

When the lower part of the probe 32 reaches a predetermined position in this manner, and the lower end of the contact member 26a of the displacement sensor 22 is brought into contact with the upper surface of the receiving member 28d of the corresponding reference member 28 and pushed into the sensor body 24 by a predetermined amount, in a state where the drive mechanism 38 of the welding tool 30 continuously rotates the probe 32 under control of the controller C, the drive mechanism of the robot body 56 moves the arm 54 so that the probe 32 and the auxiliary support member 42 are moved in a moving direction, which is the predetermined processing direction, in a state where their positional correspondence relation with respect to the processing target members W is maintained. As a result, the first member W1 and the second member W2 are friction stir welded corresponding to a moved track of the lower part of the probe 32. The auxiliary support member 42 is moved in the predetermined processing direction while rotating in the holder 44, in a state where the auxiliary support member 42 comes into contact with the lower surface of the mounting portion 10a of the mounting table 10 at one point on the upper part of the auxiliary support member 42, so as to face the lower part of the probe 32, putting the processing target member W therebetween.

At this time, because the probe 32 is moved in a predetermined processing direction while rotating in a state where the probe 32 penetrates through the first member W1 and intrudes into the second member W2 by pressing the processing target member W, a processing reaction force is applied to the probe 32 upward vertical to the processing target side surface Ws of the processing target member W. At the time of performing friction stir welding, even when the processing target member W is a curved member, the drive mechanism of the robot body 56 moves the arm 54, so that the probe 32 vertically presses the processing target side surface Ws. However, in FIGS. 2 and 3, for convenience' sake, the processing target member W is shown as a plate member, and it is assumed that the processing reaction force is applied upward. As a result, the processing reaction force is also applied to the fitting jig 52 to which the welding tool 30 is fixedly installed, via the welding tool 30 that holds the probe 32, to cause elastic deformation in the upper fitting portion 52a of the fitting jig 52. Correspondingly thereto, a vertical positional error is caused in the probe 32 of the welding tool 30 fixed and fitted to the upper fitting portion 52a. The displacement sensor 22 fixedly installed to the casing 38a of the drive mechanism 38 of the welding tool 30 respectively on the positive direction side and the negative direction side of the y-axis moves with the fitting jig 52 deforming in this manner. Therefore, the contact members 26a of the respective displacement sensors 22 change the relative positions with respect to the reference member 28 fixedly installed to the fixing portion 52c of the fitting jig 52, corresponding to variation with time of the deformation of the upper fitting portion 52a corresponding to variation with time of the processing reaction force.

Specifically, when the upper fitting portion 52a in the fitting jig 52 deforms in this manner, each contact member 26a of the displacement sensor 22 fixedly installed to the casing 38a of the drive mechanism 38 of the welding tool 30 respectively on the positive direction side and the negative direction side of the y-axis is pushed by the corresponding receiving member 28d to be pressed into the sensor body 24 against the urging force and moved upward, or pushed back by the urging force from the sensor body 24 and moved downward to press the corresponding receiving member 28d, according to a change in the relative position between the respective displacement sensors 22 and the corresponding reference member 28, in a state where the lower end of the contact member 26a comes into contact with the corresponding upper surface of the receiving member 28d of the reference member 28. The respective displacement sensors 22 detect the detection values respectively according to the deformation of the upper fitting portion 52a in the fitting jig 52, specifically, an amount of vertical displacement of the probe 32 having the central axis Z coaxial to the moving axis of the respective contact members 26a as viewed in the direction of the y-axis, according to the amount of movement of the respective contact members 26a at this time.

Accordingly, based on a detection value corresponding to the amount of vertical displacement of the probe 32 detected by the respective displacement sensors 22, the controller C controls the drive mechanism 38 of the welding tool 30 to apply an amount of displacement that compensates such an amount of vertical displacement to the probe 32. As a result, the drive mechanism 38 moves the probe 32 in a vertical direction so that the amount of vertical displacement of the probe 32 detected by the displacement sensors 22 is compensated. That is, when the probe 32 is displaced upward, the drive mechanism 38 moves the probe 32 downward, and when the probe 32 is displaced downward, the drive mechanism 38 moves the probe 32 upward to press the probe 32 into the processing target member W while adjusting the position of the probe 32. Consequently, the intruding depth of the probe 32 penetrating through the first member W1 and intruding into the second member W2 is maintained substantially constant at the time of performing friction stir welding. Furthermore, under control of the controller C, the drive mechanism of the robot body 56 continuously moves the arm 54 so that the probe 32 and the auxiliary support member 42 are moved in the moving direction, which is the predetermined processing direction. With regard to the amount of vertical displacement of the probe 32 detected by the respective displacement sensors 22, it is simpler to average these amounts of displacement to calculate the amount of vertical displacement to be applied to the probe 32. However, the amount of vertical displacement to be applied to the probe 32 can be calculated by using a predetermined calculation formula using the amount of vertical displacement of the probe 32 detected by the respective displacement sensors 22 as a parameter according to the shape of the processing target member W or complexity and the like in the processing direction. When the friction stir welding is continuously performed, the moved track of the lower part of the probe 32 matches with a predetermined weld line, and corresponding thereto, in the first member W1 and the second member W2, a weld portion that has been friction stir welded along the predetermined weld line can be obtained.

When the probe 32 and the like have been moved to a predetermined position, which is an end point of a portion required to be friction stir welded, with the movement of the arm 54, the drive mechanism 38 of the welding tool 30 moves the probe 32 upward while maintaining the rotation of the probe 32, to pull out the probe 32 from the processing target member W under control of the controller C, and after having uplifted the probe 32 to the upper position thereof, stops the movement of the probe 32. The drive mechanism of the robot body 56 then moves the arm 54 so that the probe 32 and the auxiliary support member 42 exit from the upper and lower areas of the processing target member W, and stops the movement of the arm 54.

Lastly, when the processing target member W is released by detaching the stopper 14 and is dismounted from the mounting table 10, a processed product in which a predetermined portion is friction stir welded can be obtained.

In the configuration according to the first embodiment described above, a configuration example in which the processing target member W is fixed to the mounting table 10, and the welding tool 30 and the auxiliary support mechanism 40 are movably fitted to the arm 54 of the robot 50 has been explained. However, in principle, it is only required that the processing target member W, the welding tool 30, and the auxiliary support mechanism 40 can be moved relative to one another. Therefore, in an opposite manner, a configuration example in which the processing target member W can be fitted movably to the arm 54 of the robot 50, and the welding tool 30 and the auxiliary support mechanism 40 are fixed to the mounting table 10 can be also adopted. However, in this case, the displacement detecting device 20 detects displacement of the fitting jig on the processing target member W side.

Specifically, after the mounting jig 12 onto which the processing target member W which is to be friction stir welded, is mounted and fixed is fitted to the fitting jig of the arm 54 of the robot 50, the probe 32 of the welding tool 30 fitted and fixed to the mounting table 10 is press-fitted into the processing target member W to stir the processing target member W, the mounting jig 12 to which the processing target member W is fixed is moved by the arm 54 to perform friction stir welding with respect to the processing target member W, in a state where the auxiliary support member 42 of the auxiliary support mechanism 40 fitted and fixed to the mounting table 10 comes into contact with the lower surface of the mounting jig 12 to which the processing target member W is fixed. At this time, by fixedly installing the displacement detecting device 20 to the mounting jig 12, and fixedly installing the reference member to the fixing portion in the fitting jig of the arm 54, friction stir welding can be similarly performed while compensating the amount of relative vertical displacement of the probe 32 and the processing target member W caused by deformation of the fitting jig of the arm 54 at the time of performing friction stir welding.

In the configuration according to the first embodiment described above, the processing target member W can have not only a planar shape but also a curved shape, so long as friction stir welding is performed in a state where the probe 32 and the auxiliary support member 42 maintain a positional correspondence relation with respect to the processing target member W. When the processing target member W has a curved shape, the displacement detecting device 20 and the welding tool 30 face the auxiliary support mechanism 40 in a direction vertical to the curved surface, putting the processing target member W therebetween, and a pressing and intruding direction of the probe 32 of the welding tool 30 with respect to the processing target member W and the moving direction of the contact member 26a of the displacement sensor 22 can be a direction vertical to the curved surface of the processing target member W. Furthermore, the processing direction can be linear or curved.

In the configuration according to the first embodiment described above, when it is desired to simplify the structure, only one displacement sensor 22 can be provided. Alternatively, when it is desired to increase detection accuracy, three or more displacement sensors 22 can be arranged so that the contact members 26a thereof are arranged at axisymmetrical positions with respect to the central axis Z of the probe 32.

In the configuration according to the first embodiment described above, the fixing portion 52c to which the reference member 28 is fixed can be set in the arm 54 itself. The fitting jig 52 can be formed not only by a single member but also by a plurality of members. Furthermore, the receiving member 28d of the reference member 28 can be omitted so that the lower end of the contact member 26a of the displacement sensor 22 directly comes into contact with the upper surface of the second end 28b of the reference member 28.

In the configuration according to the first embodiment described above, a configuration example of applying the auxiliary support mechanism 40 has been explained. However, the auxiliary support mechanism 40 can be omitted in a case where required processing accuracy is relatively low.

In the configuration according to the first embodiment described above, it has been explained that the auxiliary support member 42 of the auxiliary support mechanism 40 is a ball member. However, other movable members such as a rotatable member can be applied, or a fixed member can be used when friction and the like hardly occurs.

According to the configuration of the first embodiment described above, the displacement detecting device that detects displacement of the welding tool caused by deformation of the fitting jig, at the time of performing friction stir welding in which the arm is moved to move the welding tool with respect to the processing target member while stirring the processing target member by rotating the probe relative to the processing target member and pressing the probe to intrude into the processing target member is provided. At the time of performing friction stir welding, the fitting jig can be deformed more than the arm. Because the displacement detecting device includes the displacement sensor fixed to the welding tool, and the reference member fixed to the fixing portion between the fitting jig and the arm to provide a reference position for displacement detection with respect to the displacement sensor, the distance between the probe and the processing target component can be controlled to a predetermined distance in a mode having high application flexibility with a simple configuration with respect to a wide variety of processing target components in which the shape of the portion to be friction stir welded varies, while compensating unnecessary displacement of the probe.

According to the configuration of the first embodiment, the displacement sensor is a contact-type displacement sensor, and the reference member includes the first end fixed to the fixing portion on which the fitting jig is fixed to the arm, the second end opposite to the first end, and the extending portion that extends with respect to the fitting jig between the first end and the second end without being constrained, with the contact member of the displacement sensor being able to contact with the second end. Accordingly, the distance between the probe and the processing target component can be controlled to a predetermined distance in a mode having higher application flexibility with a simpler configuration with respect to a wide variety of processing target components in which the shape of the portion to be friction stir welded varies, while compensating unnecessary displacement of the probe more reliably.

According to the configuration of the first embodiment, because the moving direction of the contact member of the displacement sensor is parallel to the central axis of the probe, the contact member moves vertically, while coming into contact with the reference member at the time of performing friction stir welding. As a result, vertical, displacement of the probe caused by deformation of the fitting jig can be detected accurately. Furthermore, because the displacement sensor and the reference member respectively include the first pair and the second pair in which the contact member and the second end are arranged symmetrically with respect to the central axis of the probe, the vertical displacement of the probe can be obtained at two displacement detecting positions close to the displacement in a mode in which a calculation process can be easily performed.

According to the configuration of the first embodiment, because the connecting member that connects between the extending portion of the reference member in the first pair and the extending portion of the reference member in the second pair is provided, connection strength between the reference members increases to improve the strength and the rigidity of the entire reference member, thereby enabling to obtain a positional reference of the displacement sensor more accurately.

According to the configuration of the first embodiment, because the movement mechanism is an industrial robot, a friction stir welding apparatus that can reliably control the distance between the probe and the processing target component to a predetermined distance in a more versatile configuration can be realized.

According to the configuration of the first embodiment, the auxiliary support mechanism fitted to the arm to support the mounting member by the auxiliary support member to auxiliary support only the vertical position of the processing target member is provided. Therefore, the probe and the processing target member can be positioned more accurately, and friction stir welding can be performed while controlling the distance between the probe and the processing target component to a predetermined distance more reliably.

A friction stir welding apparatus according to a modification of the first embodiment is explained in detail with reference also to FIGS. 4 and 5.

Figure 4:
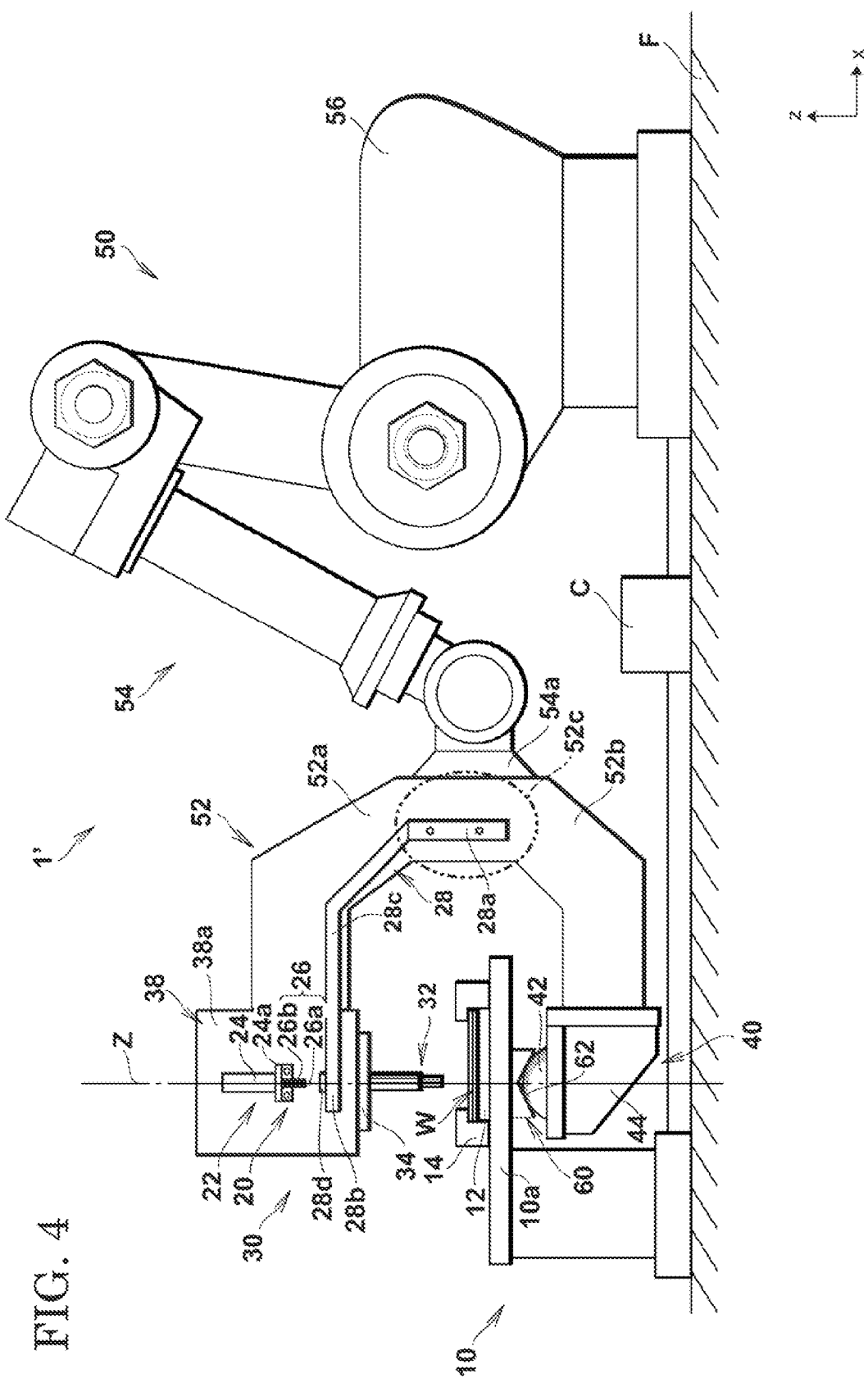
FIG. 4 is a side view showing an overall configuration of a friction stir welding apparatus according to a modification of the first embodiment.

FIG. 4 is a side view showing an overall configuration of the friction stir welding apparatus according to the modification. FIG. 5 is a partially enlarged side view of the friction stir welding apparatus according to the modification.

In a friction stir welding apparatus 1' according to the modification, such a configuration is assumed that the auxiliary support mechanism 40 is provided in the configuration of the first embodiment, and a different point from the first embodiment is that a guide member 60 that guides the auxiliary support member 42 is further provided, and other configurations are the same as those of the first embodiment.

Figure 5:
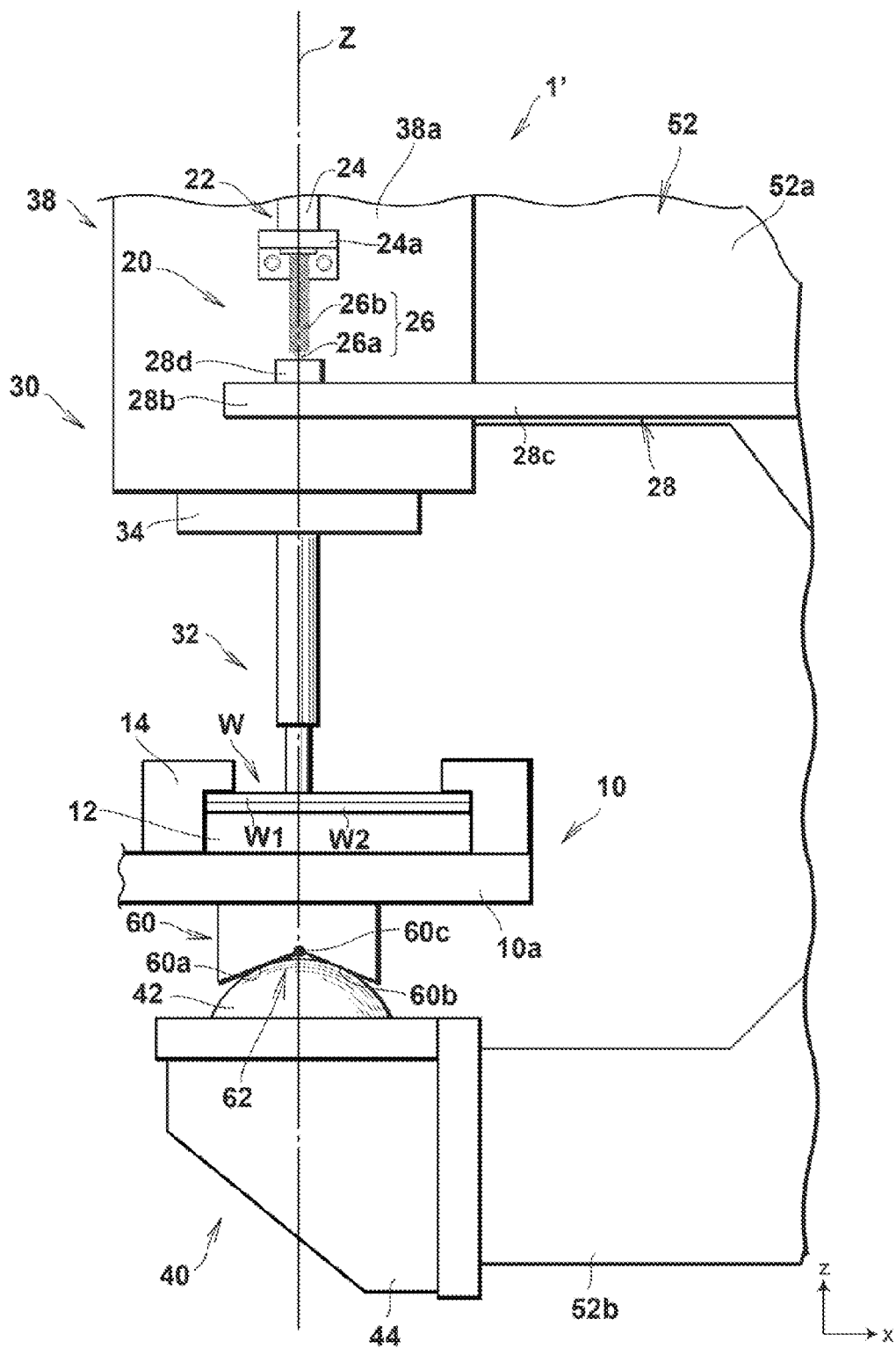
FIG. 5 is a partially enlarged side view of the friction stir welding apparatus according to the modification.

Specifically, in the friction stir welding apparatus 1' according to the modification, as shown in FIGS. 4 and 5, the guide member 60 is fixedly installed on the lower surface of the mounting portion 10a of the mounting table 10 and has a guide groove 62 to accommodate and guide the auxiliary support member 42 of the auxiliary support mechanism 40. Specifically, the guide groove 62 of the guide member 60 is arranged to face the weld line and extend parallel thereto, away and downward from the processing direction of friction stir welding in the friction stir welding apparatus 1', that is, from the weld line obtained as a result, while defining a depressed shape that opens downward. At the time of performing friction stir welding using the friction stir welding apparatus 1', the auxiliary support member 42 is moved facing the processing direction and parallel thereto, away and downward from the processing direction of friction stir welding, in a state of being accommodated in the guide groove 62, and away and downward from the weld line obtained as a result to form a track facing the weld line and parallel thereto.

For example, when a ball member is used as the auxiliary support member 42, the guide groove 62 is formed as a triangular groove by a first inclined surface 60a and a second inclined surface 60b both originating from a valley line 60c. The valley line 60c is set away and downward from the processing direction of friction stir welding in the friction stir welding apparatus 1', that is, the weld line obtained as a result, and facing the weld line and extending parallel thereto. Accordingly, the guide member 60 having the guide groove 62 formed by the first and second inclined surfaces 60a and 60b originating from the valley line 60c is also away and downward from the weld line, facing the weld line and extending parallel thereto. In this case, the auxiliary support member 42, which is the ball member, comes into contact with the first and second inclined surfaces 60a and 60b.

In the configuration according to the modification, the guide groove 62 of the guide member 60 can be formed by an inclined surface having a curved shape in cross section. When a movable member other than the ball member or a simple fixed member is used as the auxiliary support member 42 of the auxiliary support mechanism 40, the guide groove 62 of the guide member 60 suffices to have a shape that has a function of accommodating and guiding the movable member or the fixed member in the same manner as the ball member.

According to the configuration of the modification, the friction stir welding apparatus further includes the guide member that guides the auxiliary support member. Therefore, the probe and the processing target member can be positioned more accurately, and friction stir welding can be performed while controlling the distance between the probe and the processing target component to a predetermined distance more reliably.

A friction stir welding apparatus according to another modification of the first embodiment is explained in detail with reference also to FIGS. 6 and 7.

Figure 6:
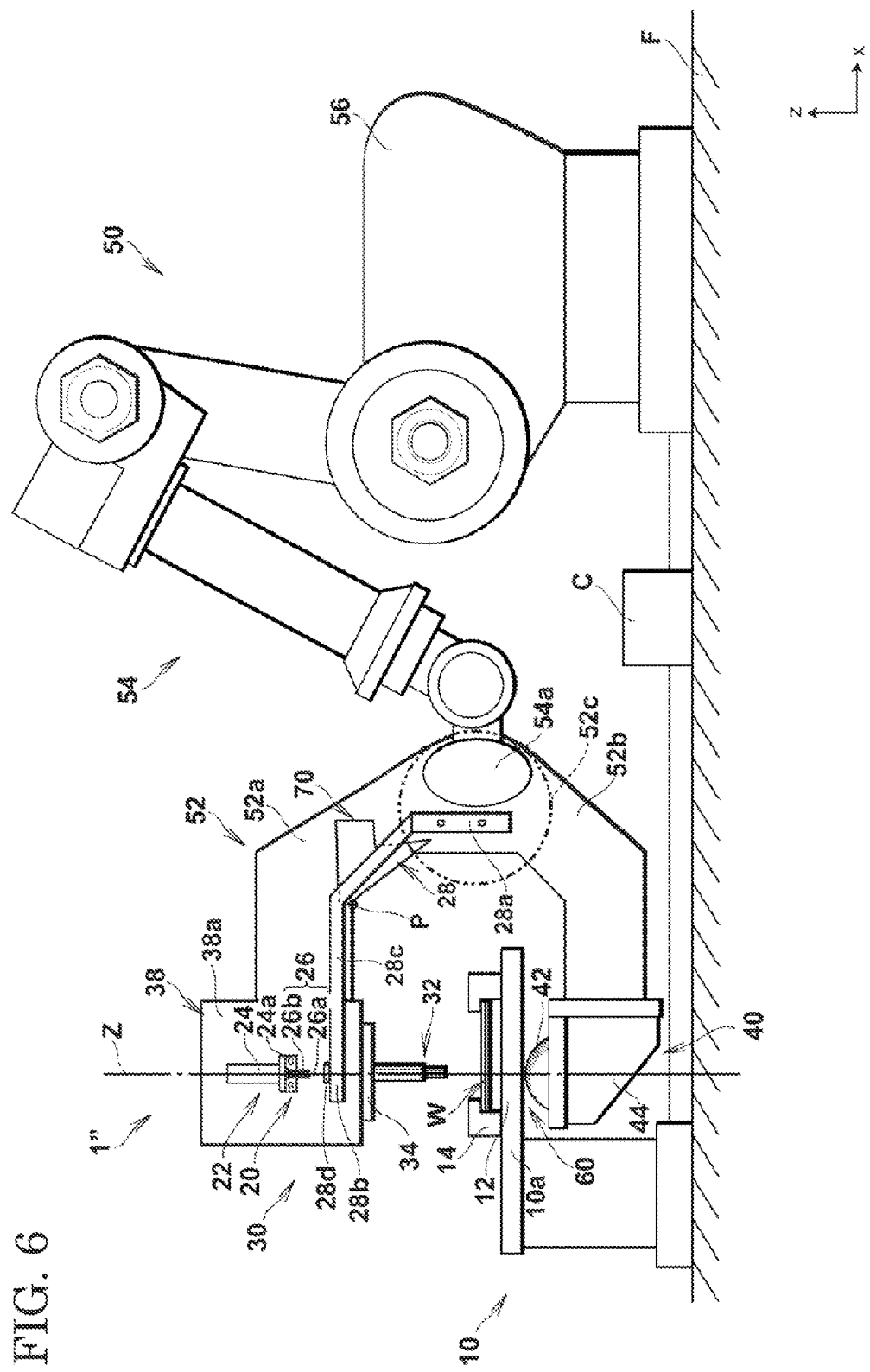
FIG. 6 is a side view showing an overall configuration of a friction stir welding apparatus according to another modification of the first embodiment.
Figure 7A:
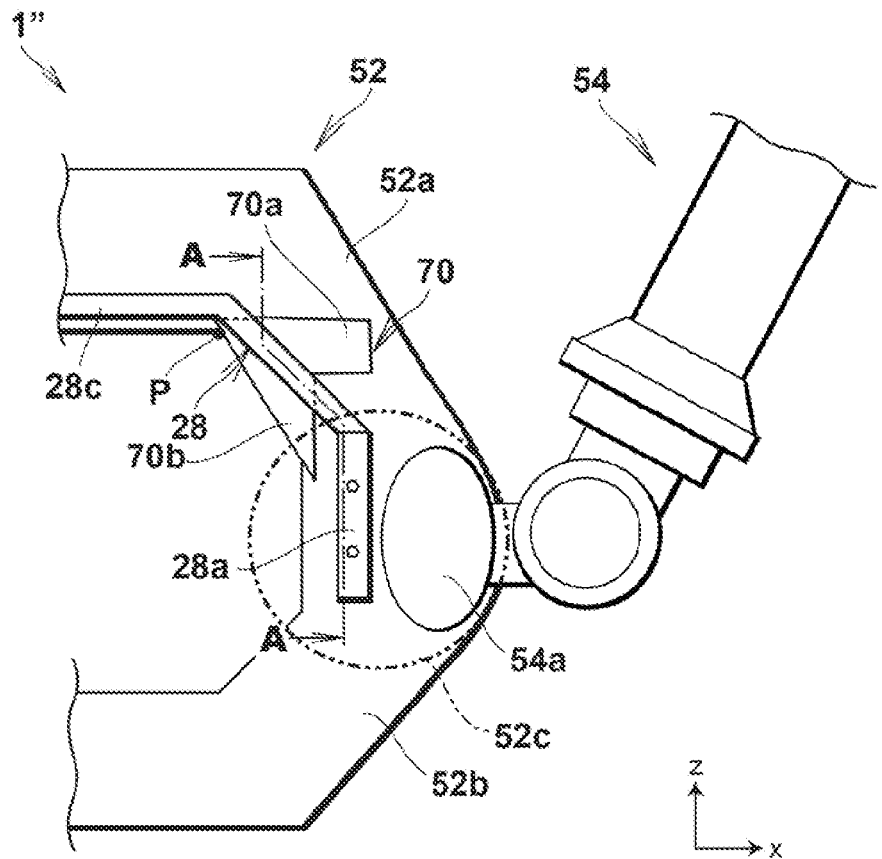
FIG. 7A is a partially enlarged side view of the friction stir welding apparatus of the modification and FIG. 7B is a sectional view along a line A-A in FIG. 7A.
Figure 7B:
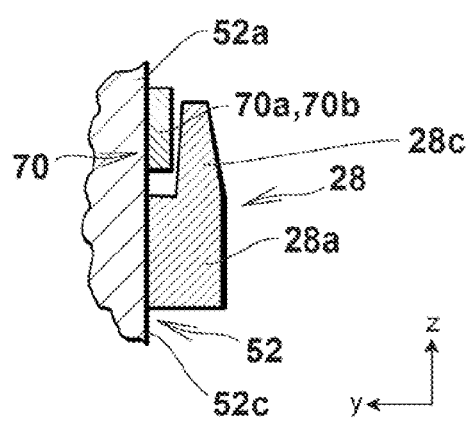

FIG. 6 is a side view showing an overall configuration of the friction stir welding apparatus according to the modification. FIG. 7A is a partially enlarged side view of the friction stir welding apparatus of the modification. FIG. 7B is a sectional view along a line A-A in FIG. 7A.

In a friction stir welding apparatus 1" according to the modification, a different point from the first embodiment explained above is that the position of the support portion 54a at one end of the arm 54 is changed, and a reinforcing member 70 is provided so as to protrude in a rib-like shape, and other configurations are the same as those of the first embodiment. Therefore, in this modification, the point different from the first embodiment is explained, and like configurations are denoted by like reference characters and explanations thereof are appropriately simplified or omitted.

Specifically, in the friction stir welding apparatus 1″ according to the modification, as shown in FIGS. 6 and 7, the support portion 54*a* at one end of the arm 54 is fixedly installed to the fixing portion 52*c* in the connected portion between the upper fitting portion 52*a* and the lower fitting portion 52*b* by fastening and the like with respect to the vertical wall surface on the negative direction side of the y-axis of the fitting jig 52.

The reinforcing member 70 is fixedly installed on the vertical wall surface (the surface parallel to the x-z plane) on the negative direction side of the y-axis of the upper fitting portion 52*a* of the fitting jig 52 in a protruding manner from the vertical wall surface toward the negative direction side of the y-axis between the welding tool 30 and the fixing portion 52*c*, and includes a body portion 70*a* and an expanding portion 70*b* extending downward from the body portion 70*a*.

Specifically, the body portion 70*a* of the reinforcing member 70 has a vertical length spanning vertically on the vertical wall surface on the negative direction side of the y-axis of the upper fitting portion 52*a*, across a bend line P (typically, extending vertically to the x-z plane) that changes while bending over toward the negative direction side of the x-axis so that the shape of the upper fitting portion 52*a* overhangs toward the welding tool 30, while protruding from the vertical wall surface on the negative direction side of the y-axis of the upper fitting portion 52*a* toward the negative direction side of the y-axis, and extends from a peripheral edge on the negative direction side of the x-axis of the upper fitting portion 52*a* toward the positive direction side of the x-axis.

The expanding portion 70*b* of the reinforcing member 70 extends downward from the body portion 70*a* so as to intrude into the fixing portion 52*c* while protruding from the vertical wall surface on the negative direction side of the y-axis of the upper fitting portion 52*a* toward the negative direction side of the y-axis.

At the time of performing friction stir welding using the friction stir welding apparatus 1″ in which the support portion 54*a* at one end of the arm 54 is fixedly installed on the vertical wall surface on the negative direction side of the y-axis of the upper fitting portion 52*a* of the fitting jig 52, in the vertical wall surface on the negative direction side of the y-axis of the upper fitting portion 52*a*, stress becomes the largest in a portion from an area near the bend line P to an upper area of the fixing portion 52*c*. Accordingly, stress concentration is relaxed by providing the body portion 70*a* of the reinforcing member 70 to increase a sectional area of this portion. Furthermore, by providing the expanding portion 70*b* of the reinforcing member 70, the area near the bend line P is connected to the fixing portion 52*c*, which is a high stiffness portion, to suppress deformation thereof and to relax the stress concentration.

Because the reinforcing member 70 needs to have a shape intersecting with the reference member 28 as viewed in a side view, the body portion 70*a* and the expanding portion 70*b* of the reinforcing member 70 pass through a space between the extending portion 28*c* that is away from the vertical wall surface on the negative direction side of the y-axis of the upper fitting portion 52*a* and the vertical wall surface in an overwrapped manner, by increasing the thickness of the first end 28*a* of the reference member 28 in the direction of the y-axis. Therefore, the body portion 70*a* and the expanding portion 70*b* of the reinforcing member 70 do not bypass the reference member unnecessarily and do not interfere with the reference member unnecessarily.

In terms of balancing the strength and the stiffness of the fitting jig 52, the reinforcing member 70 can be fixedly installed on the vertical wall surface (the surface parallel to the x-z plane) on the positive direction side of the y-axis of the upper fitting portion 52*a* so as to protrude therefrom toward the positive direction side of the y-axis, in the same manner as that on the vertical wall surface (the surface parallel to the x-z plane) on the negative direction side of the y-axis of the upper fitting portion 52*a* so as to be provided in two and form a pair. Because the configuration thereof is the same, detailed explanations thereof are omitted.

In the configuration of the modification described above, when the stress in the portion from the area near the bend line P, which is generated at the time of performing friction stir welding using the friction stir welding apparatus 1″, to the upper area of the fixing portion 52*c* is not excessively large, only the body portion 70*a* can be provided in the reinforcing member 70 and the expanding portion 70*b* can be omitted.

In the configuration of the modification described above, a part of the reinforcing member 70 can be lifted, so that the reference member 28 can pass through a space between the reinforcing member 70 and the vertical wall surface of the fitting jig 52.

In the configuration of the modification described above, when the reinforcing member 70 is configured as a separate component that is independent from the fitting jig 52, the stress generated at the time of performing friction stir welding using the friction stir welding apparatus 1″ can be reduced with high flexibility. However, when the area having large stress can be accurately predicted beforehand, the reinforcing member 70 can be provided as an integrally molded product with the fitting jig 52.

In the configuration of the modification described above, the support portion 54*a* at one end of the arm 54 is fixedly installed to the fixing portion 52*c* in the connected portion between the upper fitting portion 52*a* and the lower fitting portion 52*b* on the vertical wall surface on the negative direction side of the y-axis of the upper fitting portion 52*a* of the fitting jig 52. However, as in the first embodiment, the support portion 54*a* can be fixedly installed at an end of the upper fitting portion 52*a* on the positive direction side of the x-axis. Also in this case, it is desired to provide the reinforcing member 70 on both vertical wall surfaces on the positive and negative direction sides of the y-axis of the upper fitting portion 52*a* so as to relax the stress generated therein.

In the configuration of the modification described above, even when the length of the upper fitting portion 52*a* overhanging toward the welding tool 30 becomes short and the welding tool 30 comes into contact with the bend line P, the similar reinforcing member 70 can be applied. Furthermore, in a case of a curved surface in which the bend line P cannot be clearly recognized in the upper fitting portion 52*a*, the similar reinforcing member 70 can be applied to the area having large stress between the welding tool 30 and the fixing portion 52*c*.

According to the configuration of the modification, because the fitting jig further includes the reinforcing member between the welding tool and the fixing portion, the stress generated in the fitting jig at the time of performing friction stir welding can be reduced.

According to the configuration of the modification, because the reinforcing member has the expanded portion expanding toward the fixing portion, the stress generated in the fitting jig at the time of performing friction stir welding can be reduced more reliably.

Second Embodiment

A friction stir welding apparatus according to a second embodiment of the present invention is explained in detail with reference to FIGS. 8 to 12.

Figure 9A:
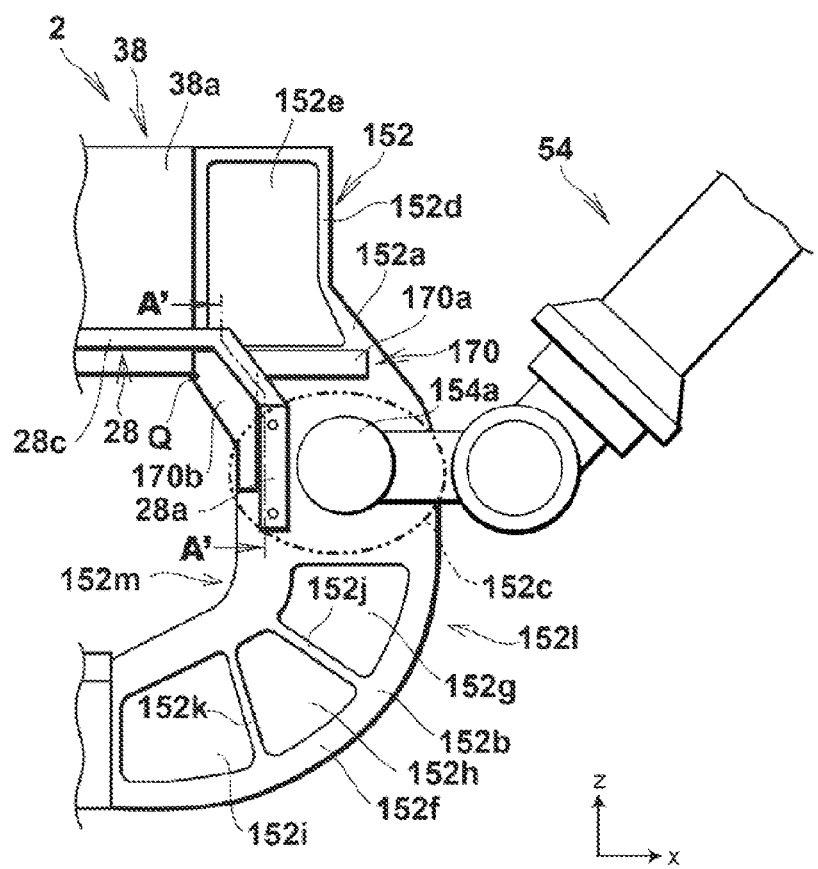
FIG. 9A is a partially enlarged side view of the friction stir welding apparatus of the second embodiment and FIG. 9B is a sectional view along a line A'-A' in FIG. 9A.
Figure 9B:
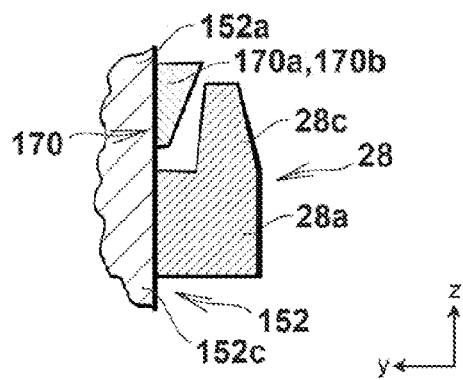
Figure 10A:
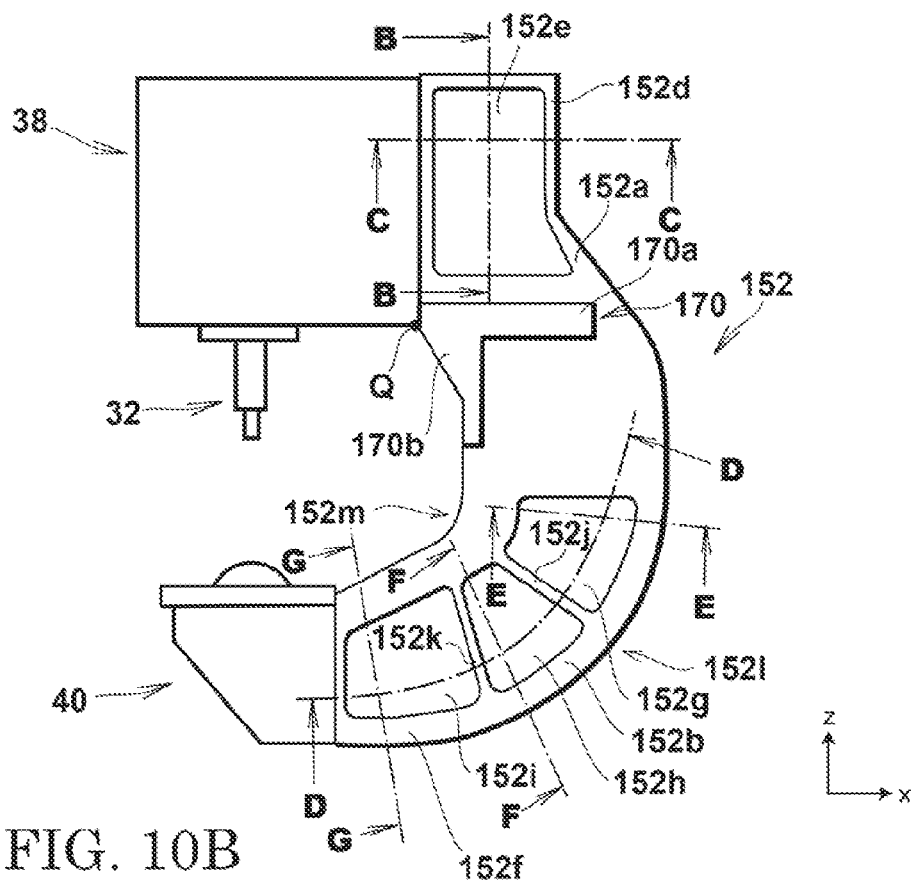
FIG. 10A is an enlarged view only showing a fitting jig, a drive mechanism, and an auxiliary support mechanism in FIG. 8.
Figure 10B:
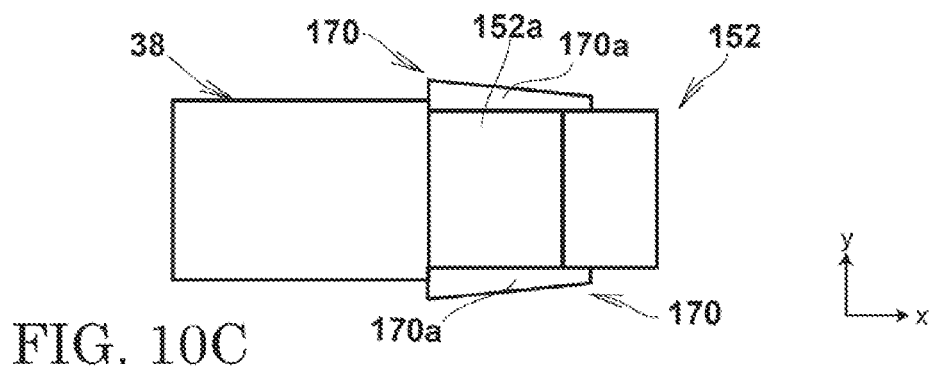
FIG. 10B is a top view of FIG. 10A as viewed in a negative direction of a z-axis.
Figure 10C:
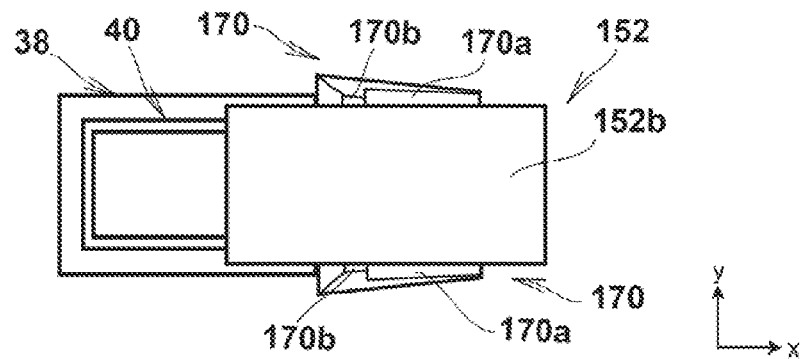
FIG. 10C is a bottom view of FIG. 10A as viewed in a positive direction of the z-axis.
Figure 11A:
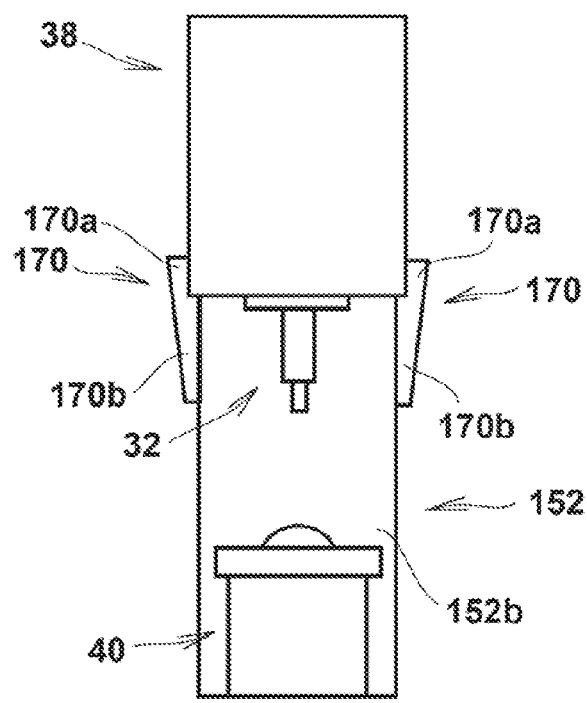
Figure 11B:
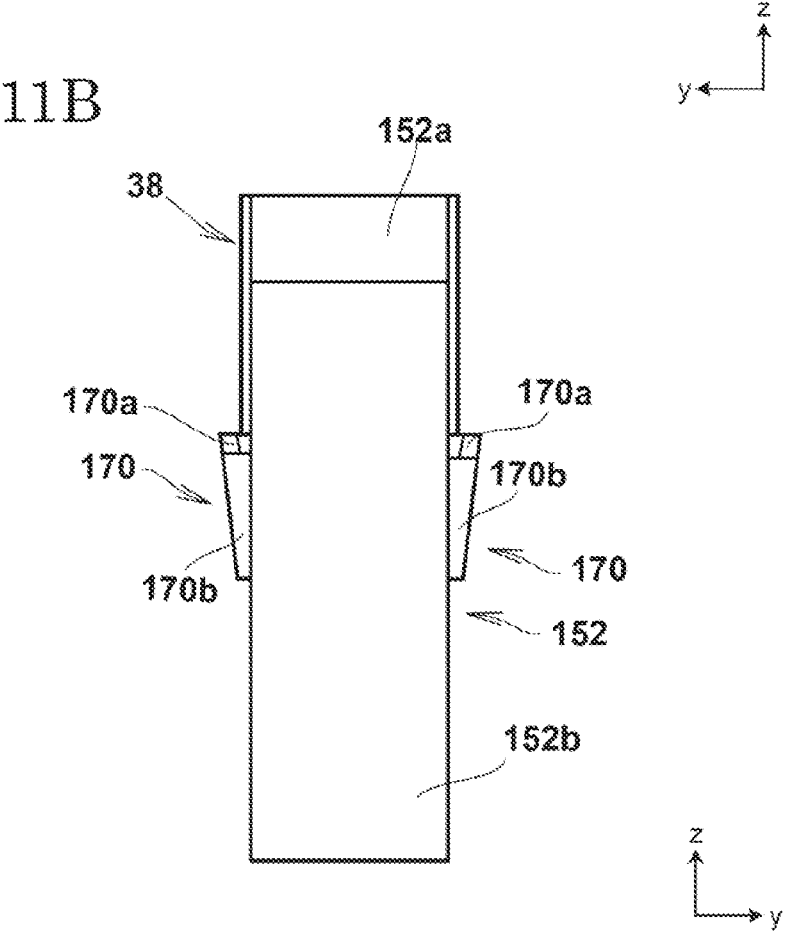
Figure 12A:
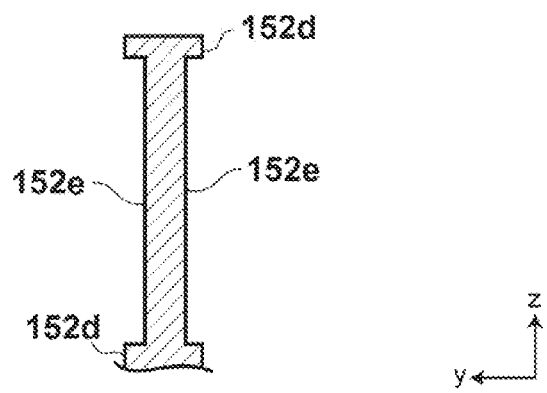
FIG. 12A is a sectional view along a line B-B in FIG. 10A.
Figure 12B:
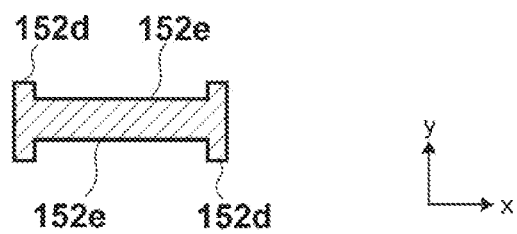
FIG. 12B is a sectional view along a line C-C in FIG. 10A.
Figure 12C:
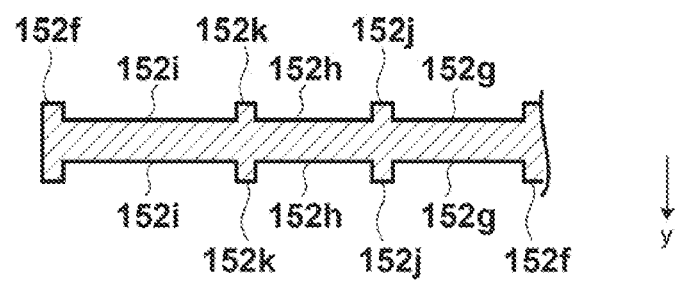
FIG. 12C is a sectional view along a line D-D in FIG. 10A.
Figure 12D:
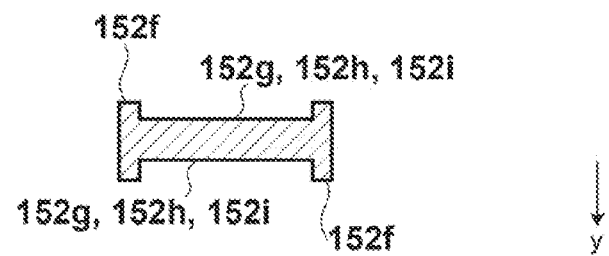
FIG. 12D is a sectional view along a line E-E in FIG. 10A, and for convenience sake', sectional views along lines F-F and G-G in FIG. 10A are both shown in FIG. 12D.

FIG. 8 is a side view showing an overall configuration of the friction stir welding apparatus according to the second embodiment. FIG. 9A is a partially enlarged side view of the friction stir welding apparatus of the second embodiment. FIG. 9B is a sectional view along a line A'-A' in FIG. 9A. FIG. 10A is an enlarged view only showing a fitting jig, a drive mechanism, and an auxiliary support mechanism in FIG. 8. FIG. 10B is a top view of FIG. 10A as viewed in a negative direction of the z-axis. FIG. 10C is a bottom view of FIG. 10A as viewed in a positive direction of the z-axis. FIG. 11A is a front view of FIG. 10A as viewed in a positive direction of the x-axis. FIG. 11B is a rear view of FIG. 10A as viewed in a negative direction of the x-axis. FIG. 12A is a sectional view along a line B-B in FIG. 10A. FIG. 12B is a sectional view along a line C-C in FIG. 10A. FIG. 12C is a sectional view along a line D-D in FIG. 10A. FIG. 11D is a sectional view along a line E-E in FIG. 10A. For convenience sake', sectional views along lines F-F and G-G in FIG. 10A are both shown in FIG. 12D.

In a friction stir welding apparatus 2 according to the second embodiment, the main different point from the configuration of the first embodiment including the respective modifications is that a detailed configuration of a fitting jig 152 and a detailed configuration of a reinforcing member 170 when it is provided are changed, assuming that the auxiliary support mechanism 40 is provided, and other configurations are the same as those of the first embodiment. Therefore, in the second embodiment, the point different from the first embodiment is explained, and like configurations are denoted by like reference characters and explanations thereof are simplified or omitted.

Specifically, in the friction stir welding apparatus 2 according to the second embodiment, as shown in FIGS. 8 to 12, the fitting jig 152, which is an integrally molded product made of metal such as a machinery cutting steel product, includes a more downsized upper fitting portion 152*a* and a lower fitting portion 152*b* having an external shape that changes more smoothly with respect to the fitting jig 52 according to the first embodiment. A support portion 154*a* at one end of the arm 54 to support the fitting jig 152 is fixedly installed to a fixing portion 152*c* in the connected portion between the upper fitting portion 152*a* and the lower fitting portion 152*b* by fastening and the like with respect to the vertical wall surface on the negative direction side of the y-axis of the fitting jig 152.

When the arm 54 moves the fitting jig 152 while maintaining a dynamic property such that only a portion of the upper fitting portion 152*a* becomes a deforming portion that deforms at the time of performing friction stir welding, an inertial weight of the upper fitting portion 152*a* is set smaller than that of the lower fitting portion 152*b*. This is because the handling property of the fitting jig 152 is improved such that the probe 32 of the welding tool 30 fitted to the upper fitting portion 152*a* is swiftly and reliably moved to the processing target member W, while the rear side of the processing target member W is stably supported by the auxiliary support mechanism 40 fitted to the lower fitting portion 152*b*.

Specifically, in the fitting jig 152, when it is assumed that an upper portion than the fixing portion 152*c* is set as the upper fitting portion 152*a*, and a lower portion than the fixing portion 152*c* is set as the lower fitting portion 152*b*, the fixing portion 152*c* in the second embodiment is positioned at a higher position than the fixing portion 52*c* in the first embodiment, and the support portion 154*a* of the arm 54 is connected and fixed to the fixing portion 152*c* of the fitting jig 152 in a state of being moved higher than the support portion 54*a* in the other modification of the first embodiment.

It is set such that the vertical length of the upper fitting portion 152*a* from the support portion 154*a* is shorter than the vertical length of the lower fitting portion 152*b* from the support portion 154*a*, a front end of the upper fitting portion 152*a*, which is a matching surface of the drive mechanism 38 with the casing 38*a*, is positioned on the positive direction side of the x-axis than a front end of the lower fitting portion 152*b*, which is a matching surface of the auxiliary support mechanism 40 with the holder 44. The length of the upper fitting portion 152*a* in a direction of the x-axis from the support portion 154*a* is shorter than the length of the lower fitting portion 152*b* in the direction of the x-axis from the support portion 154*a*. The widths of the upper fitting portion 152*a* and the lower fitting portion 152*b* in the direction of the y-axis are the same, and the materials thereof are the same. A vertical wall surface (a surface parallel to the x-z plane) 152*d* of the upper fitting portion 152*a* on the positive direction side of the y-axis, a vertical wall surface (a surface parallel to the x-z plane) of the fixing portion 152*c* on the positive direction side of the y-axis, and a vertical wall surface (a surface parallel to the x-z plane) 152*f* of the lower fitting portion 152*b* on the positive direction side of the y-axis form a flush surface together. A vertical wall surface (a surface parallel to the x-z plane) 152*d* of the upper fitting portion 152*a* on the negative direction side of the y-axis, a vertical wall surface (a surface parallel to the x-z plane) of the fixing portion 152*c* on the negative direction side of the y-axis, and a vertical wall surface (a surface parallel to the x-z plane) 152*f* of the lower fitting portion 152*b* on the negative direction side of the y-axis form a flush surface together. However, when the arm 54 moves the fitting jig 152 while maintaining a dynamic property such that only a portion of the upper fitting portion 152*a* becomes a deforming portion that deforms at the time of performing friction stir welding, these dimensions can be appropriately set under a condition that the inertial weight of the upper fitting portion 152*a* is set smaller than that of the lower fitting portion 152*b*.

It is preferable to provide an upper depressed portion 152*e* depressed by cutting respectively on the vertical wall surface 152*d* on the positive direction side of the y-axis and the vertical wall surface 152*d* on the negative direction side of the y-axis in the upper fitting portion 152*a*, in a manner in which peripheral edges of the respective vertical wall surfaces are left as wall surfaces, so as to achieve weight reduction within a range in which the strength and the rigidity of the upper fitting portion 152*a* are not decreased unnecessarily.

Furthermore, it is preferable to provide a first lower depressed portion 152*g*, a second lower depressed portion 152*h*, and a third lower depressed portion 152*i* depressed by cutting sequentially from top downward, respectively, on the vertical wall surface 152*f* on the positive direction side of the y-axis and the vertical wall surface 152*f* on the negative direction side of the y-axis in the lower fitting portion 152*b*, in a manner in which peripheral edges of the respective vertical wall surfaces are left as wall surfaces, so as to achieve weight reduction within a range in which the strength and the rigidity of the lower fitting portion 152*b* are not decreased unnecessarily.

It is preferable to provide a first rib 152*j* having a height flush with the vertical wall surface 152*f* on the positive direction side of the y-axis between the first lower depressed portion 152*g* and the second lower depressed portion 152*h* on the positive direction side of the y-axis of the lower fitting portion 152b, and to provide the first rib 152j having a height flush with the vertical wall surface 152f on the negative direction side of the y-axis between the first lower depressed portion 152g and the second lower depressed portion 152h on the negative direction side of the y-axis of the lower fitting portion 152b, so that the strength and the rigidity of the lower fitting portion 152b are not decreased unnecessarily. Similarly, it is preferable to provide a second rib 152k having a height flush with the vertical wall surface 152f on the positive direction side of the y-axis between the second lower depressed portion 152h and the third lower depressed portion 152i on the positive direction side of the y-axis of the lower fitting portion 152b, and to provide the second rib 152k having a height flush with the vertical wall surface 152f on the negative direction side of the y-axis between the second lower depressed portion 152h and the third lower depressed portion 152i on the negative direction side of the y-axis of the lower fitting portion 152b.

It is preferable to reduce occurrence of unnecessary stress concentration in the lower fitting portion 152b by forming a circumferential end of the lower fitting portion 152b on the positive direction side of the x-axis in a single circular arc shape, and a circumferential end of the lower fitting portion 152b on the negative direction side of the x-axis in a smooth shape in which intersecting two linear portions are connected by a circular arc portion so as not to produce an unnecessary corner portion. In this case, it is preferable that the first rib 152j and the second rib 152k extend in a radial direction of the single circular arc shape formed at the circumferential end of the lower fitting portion 152b on the positive direction side of the x-axis, so that the strength balance of the lower fitting portion 152b is not lost. The circumferential end of the lower fitting portion 152b on the negative direction side of the x-axis can have a single circular arc shape to further reliably reduce occurrence of unnecessary stress concentration in the lower fitting portion 152b.

It is preferable that a reinforcing member 170 is provided in an area from the upper fitting portion 152a to the fixing portion 152c, for the same purpose as that of the reinforcing member 70 explained in the other modification of the first embodiment.

The reinforcing member 170 is fixedly installed on the vertical wall surface (the surface parallel to the x-z plane) on the negative direction side of the y-axis of the fitting jig 152 in a protruding manner from the vertical wall surface toward the negative direction side of the y-axis between the welding tool 30 and the fixing portion 152c, and includes a body portion 170a and an expanding portion 170b extending downward from the body portion 170a.

Specifically, the body portion 170a of the reinforcing member 170 has a length spanning vertically on the vertical wall surface 152d on the negative direction side of the y-axis of the upper fitting portion 152a, across a front lower end Q (extending vertically to the x-z plane) of the upper fitting portion 152a, which is a high stress portion, while protruding from the vertical wall surface 152d on the negative direction side of the y-axis of the upper fitting portion 152a toward the negative direction side of the y-axis, and extends from a peripheral edge on the negative direction side of the x-axis of the upper fitting portion 152a toward the positive direction side in the direction of the x-axis, thereby relaxing the stress in the upper fitting portion 152a.

The expanding portion 170b of the reinforcing member 170 extends downward from the body portion 170a so as to intrude into the fixing portion 152c, which is a high rigidity portion, while protruding from the vertical wall surface on the negative direction side of the y-axis of the upper fitting portion 152a toward the negative direction side of the y-axis, thereby relaxing the stress in the upper fitting portion 152a.

In connection thereto, it is preferable that the reinforcing member 170 extends toward the positive direction side in the direction of the x-axis, with the protruding height thereof from the vertical wall surface 152d on the negative direction side of the y-axis of the upper fitting portion 152a being gradually reduced, for weight reduction. It is also preferable that the reinforcing member 170 extends downward, with the protruding height thereof from the vertical wall surface 152d on the negative direction side of the y-axis of the upper fitting portion 152a and the vertical wall surface (the surface parallel to the x-z plane) on the negative direction side of the y-axis of the fixing portion 152c being gradually reduced.

In the reinforcing member 170, the body portion 170a and the expanding portion 170b of the reinforcing member 170 pass through a space between the extending portion 28c that is away from the vertical wall surface 152d on the negative direction side of the y-axis of the upper fitting portion 152a and the vertical wall surface 152d in an overwrapped manner, and do not interfere with the reference member 28.

The reinforcing member 170 can be fixedly installed on the vertical wall surface 152d on the positive direction side of the y-axis of the upper fitting portion 152a so as to protrude therefrom toward the positive direction side of the y-axis, in the same manner as that on the vertical wall surface 152d on the negative direction side of the y-axis of the upper fitting portion 152a of the fitting jig 152 so that two reinforcing members 170 are provided in a pair. However, because the configuration thereof is the same, detailed explanations thereof are omitted.

Also in the configuration of the second embodiment described above, when the stress in the upper fitting portion 152a is not excessively large, it suffices that only the body portion 170a is provided in the reinforcing member 170 and the expanding portion 170b can be omitted.

Also in the configuration of the second embodiment described above, it suffices that a part of the reinforcing member 170 is lifted, so that the reference member 28 can pass through a space between the reinforcing member 170 and the vertical wall surface 152d.

Also in the configuration of the second embodiment described above, the reinforcing member 170 can be provided as an integrally molded product with the fitting jig 152.

The configuration of the second embodiment described above can be also applied to a configuration in which the support portion 154a at one end of the arm 54 is fixedly installed at an end on the positive direction side of the x-axis of the upper fitting portion 152a.

Also in the configuration of the second embodiment described above, it is a matter of course that the auxiliary support mechanism 40 can be applied.

According to the configuration of the second embodiment, the fitting jig has the first fitting portion that connects the welding tool and the fixing portion, and the second fitting portion that connects the auxiliary support mechanism and the fixing portion, and the inertial weight of the first fitting portion when the arm moves the fitting jig is set to be smaller than that of the second fitting portion when the arm moves the fitting jig. Therefore, when the arm moves the fitting jig to move the welding tool in a welding direction close to the processing target member, turn-in ability on the side of the welding tool can be improved, in a state where the posture on the side of the auxiliary support mechanism is stabilized, and thus the operability of the fitting jig fitted with the welding tool and the auxiliary support mechanism by the arm can be improved.

According to the configuration of the second embodiment, further, the fitting jig is an integrally molded product made of metal, and the first fitting portion and the second fitting portion have the depressed portion provided in a depressed manner in which peripheral edges of respective vertical wall surfaces are left, and the circumferential end of the second fitting portion has a circular arc shape. Therefore, generation of unnecessary stress in the fitting jig at the time of performing friction stir welding can be suppressed while achieving weight reduction of the fitting jig.

In the present invention, the shape, the arrangement, the number, and the like of the members are not limited to those in the embodiments explained above, and it is needless to mention that the constituent elements can be modified as appropriate without departing from the scope of the invention, such as appropriately replacing these elements by other ones having identical operational effects.

As described above, the present invention provides the friction stir welding apparatus that can control the distance between the probe and the processing target component to a predetermined distance, in a mode having high application flexibility with a simple configuration with respect to a wide variety of processing target components in which the shape of the portion to be friction stir welded varies, while compensating unnecessary displacement of the probe. Therefore, because of its general purposes and universal characteristics, applications of the present invention are expected in a wide range in the field of welding of a strength member of a movable body such as an automobile.

What is claimed is:

1. A friction stir welding apparatus comprising:
    a welding tool having a probe that is vertically movable with respect to a processing target side surface of a processing target member and rotatable with respect to the processing target member;
    a mounting member on which the processing target member is mounted;
    a movement mechanism having an arm to which a fitting jig fitted with the welding tool is fixed to move the welding tool with respect to the processing target member by moving the arm; and
    a displacement detecting device detecting displacement of the welding tool caused by deformation of the fitting jig, at a time of performing friction stir welding in which the arm is moved to move the welding tool with respect to the processing target member, while stirring the processing target member by rotating the probe with respect to the processing target member and pressing the probe to intrude into the processing target member,
    wherein the fitting jig is deformed at the time of performing friction stir welding,
    wherein the displacement detecting device includes a first pair of displacement sensors, fixed to the welding tool, and a second pair of members, fixed to a fixing portion between the fitting jig and the arm,
    wherein the first pair of displacement sensors are contact-type displacement sensors each including a contact member, and the second pair of members each includes a first end fixed to the fixing portion, a second end opposite to the first end, and an extending portion extending with respect to the fitting jig between the first end and the second end without being constrained, with the respective contact members of the first pair of displacement sensors being to contact with corresponding one of the second ends,
    and wherein moving directions of the contact members are parallel to a central axis of the probe, and the contact members and the second ends are correspondingly arranged symmetrically with respect to the central axis of the probe.

2. The friction stir welding apparatus according to claim 1, wherein the friction stir welding apparatus further comprises a connecting member connecting between the extending portions of the members.

3. The friction stir welding apparatus according to claim 1, wherein the fitting jig further includes a reinforcing member between the welding tool and the fixing portion.

4. The friction stir welding apparatus according to claim 3, wherein the reinforcing member has an expanded portion expanded toward the fixing portion.

5. The friction stir welding apparatus according to claim 1, wherein the movement mechanism is an industrial robot.

6. The friction stir welding apparatus according to claim 1, wherein the friction stir welding apparatus further comprises an auxiliary support mechanism that supports the mounting member by an auxiliary support member to auxiliary support only a vertical position of the processing target member, and the auxiliary support mechanism is fitted to the fitting jig.

7. The friction stir welding apparatus according to claim 6, wherein the friction stir welding apparatus further comprises a guide member that guides the auxiliary support member.

8. The friction stir welding apparatus according to claim 6, wherein the fitting jig has a first fitting portion that connects the welding tool and the fixing portion, and a second fitting portion that connects the auxiliary support mechanism and the fixing portion, and an inertial weight of the first fitting portion when the arm moves the fitting jig is smaller than that of the second fitting portion when the arm moves the fitting jig.

9. The friction stir welding apparatus according to claim 8, wherein the fitting jig is an integrally molded product made of metal, and the first fitting portion and the second fitting portion have a depressed portion provided in a depressed manner in which peripheral edges of respective vertical wall surfaces are left, and a circumferential end of the second fitting portion has a circular arc shape.

* * * * *